Sept. 29, 1970  W. HOFFMANN  3,530,640
BUNDLING MACHINE

Filed Oct. 6, 1966  16 Sheets-Sheet 1

INVENTOR
Wolfgang HOFFMANN

ATTORNEY

INVENTOR
Wolfgang HOFFMANN
ATTORNEY

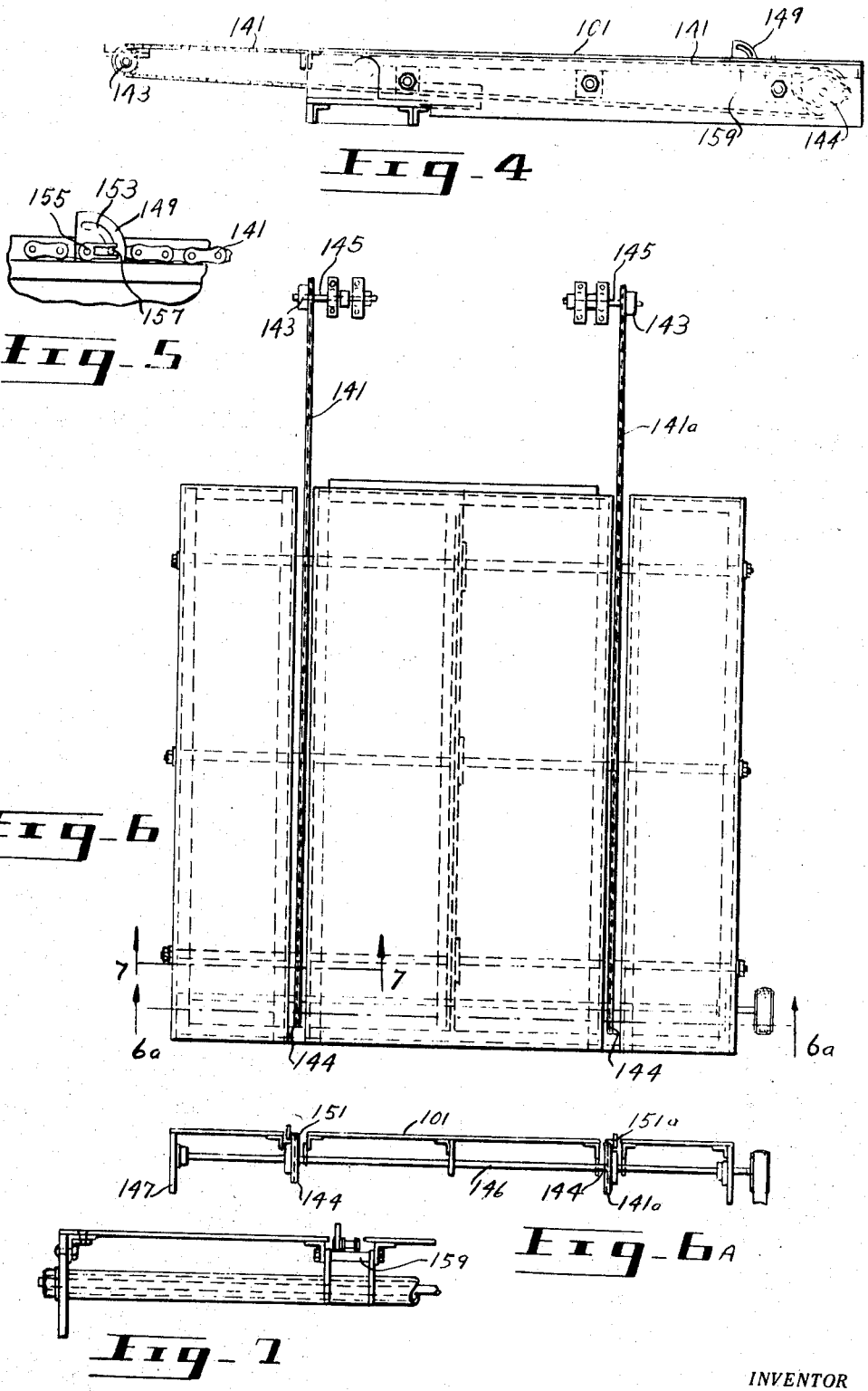

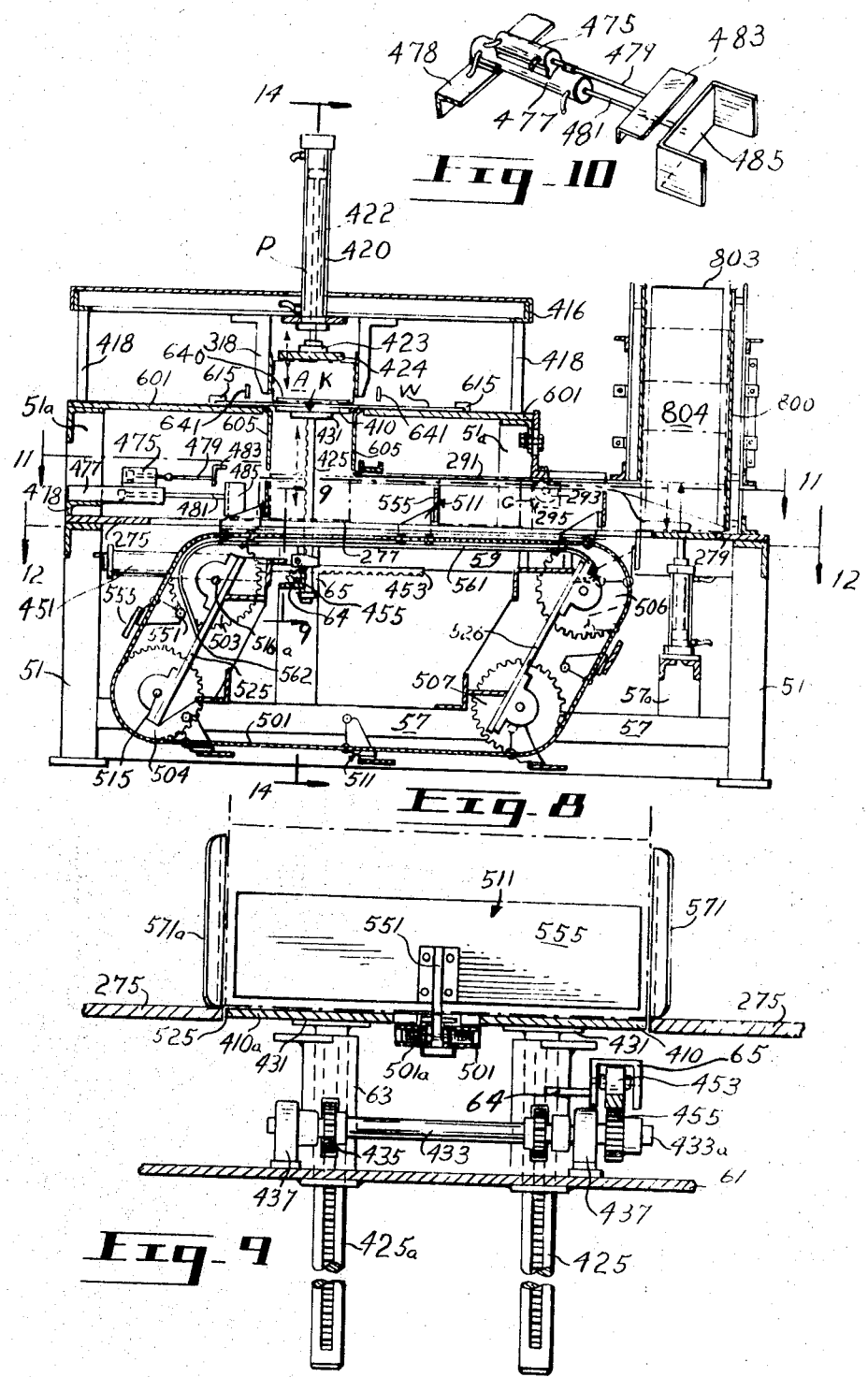

*INVENTOR*
Wolfgang HOFFMANN

*ATTORNEY*

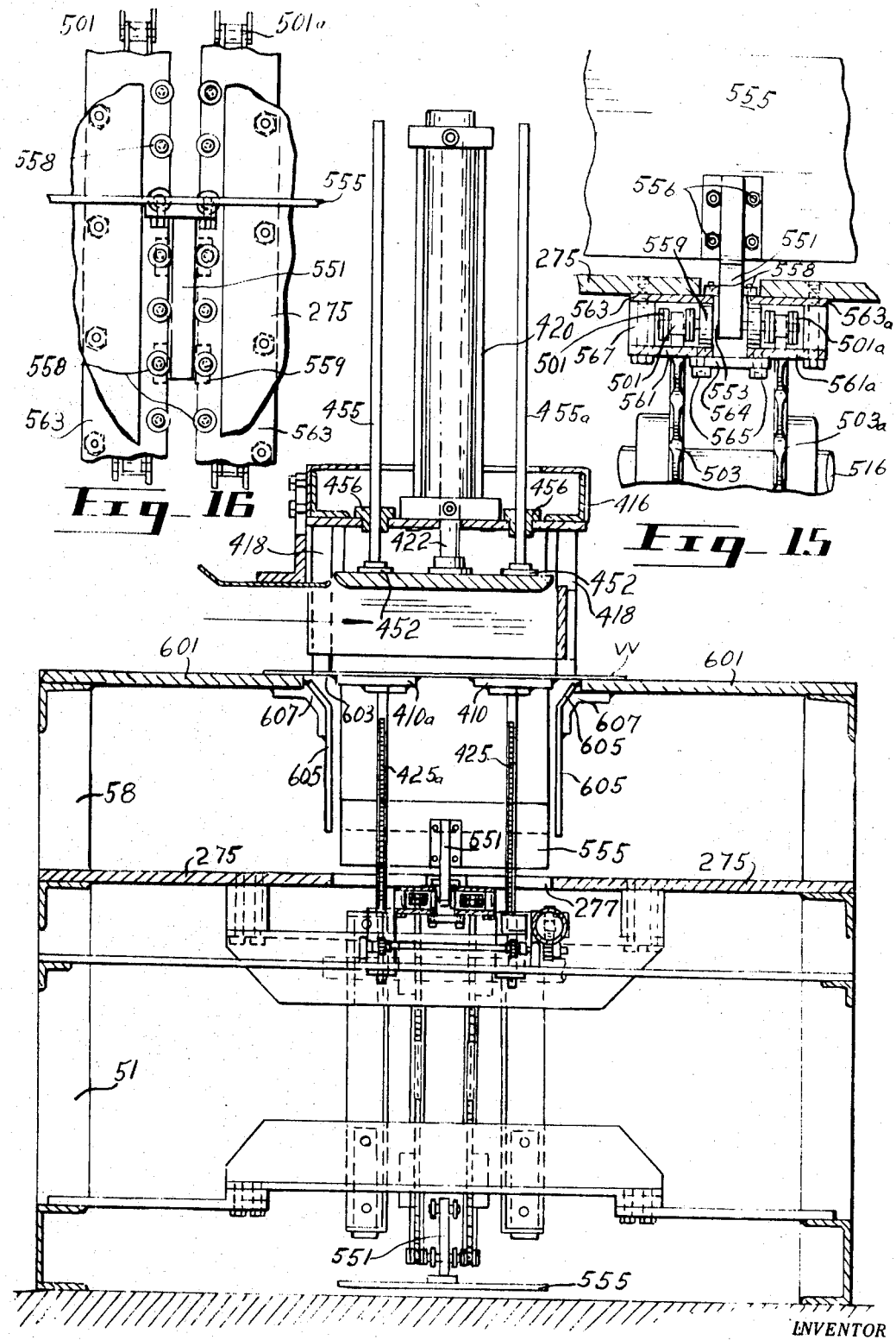

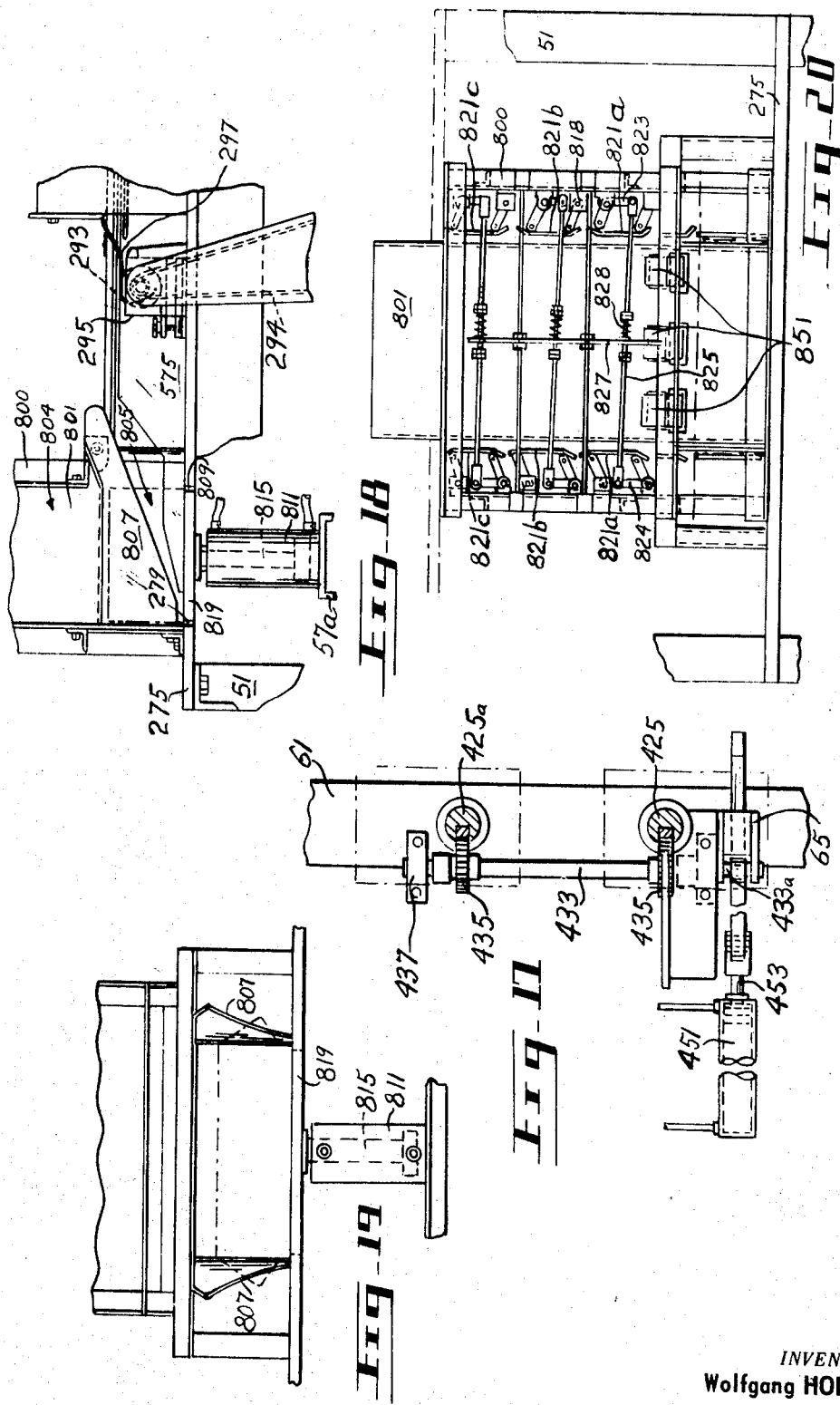

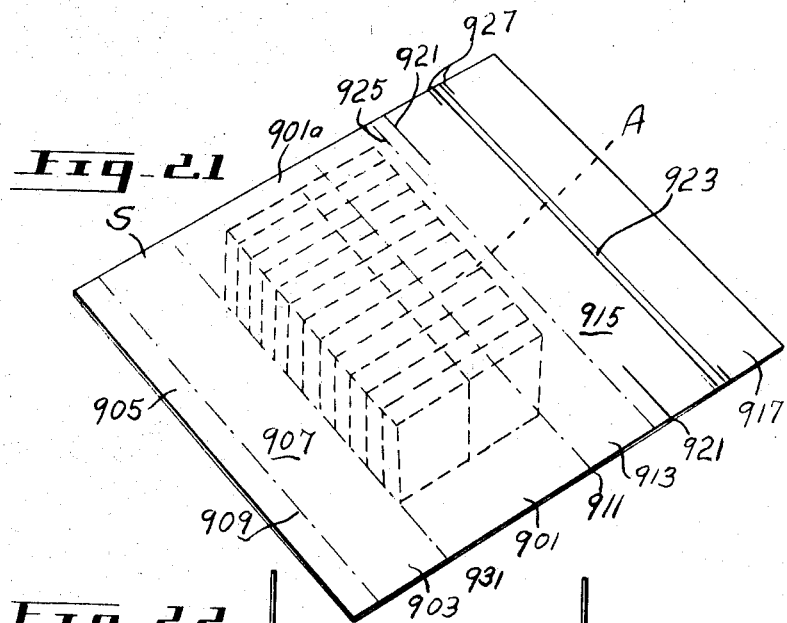
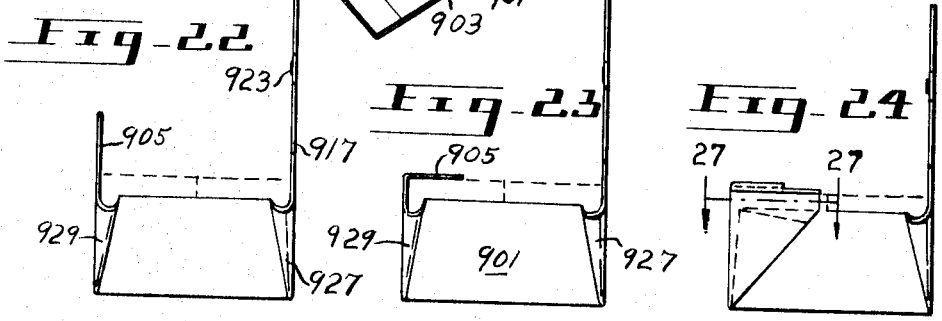
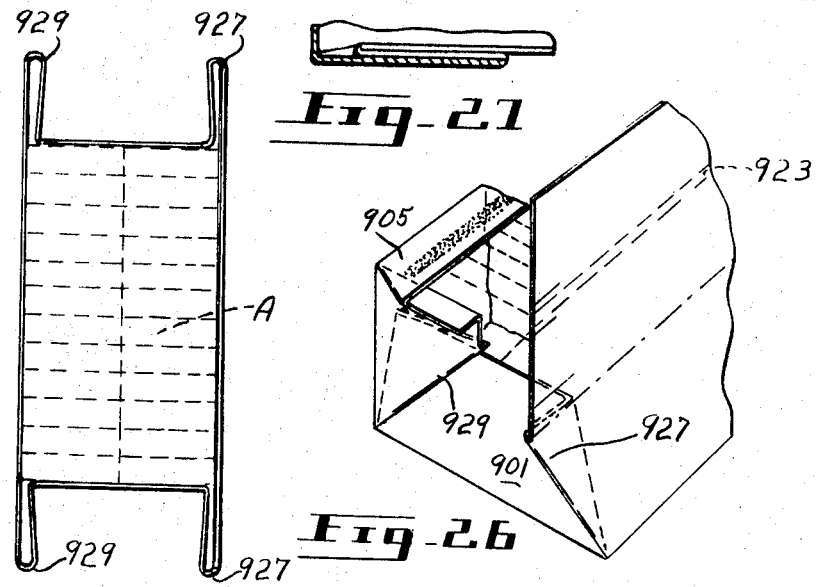

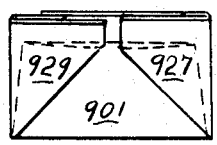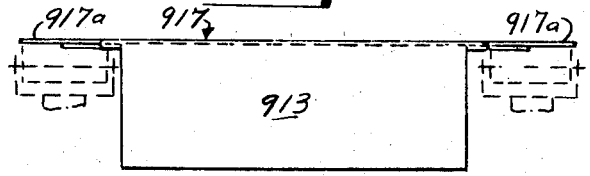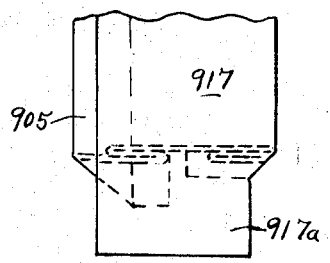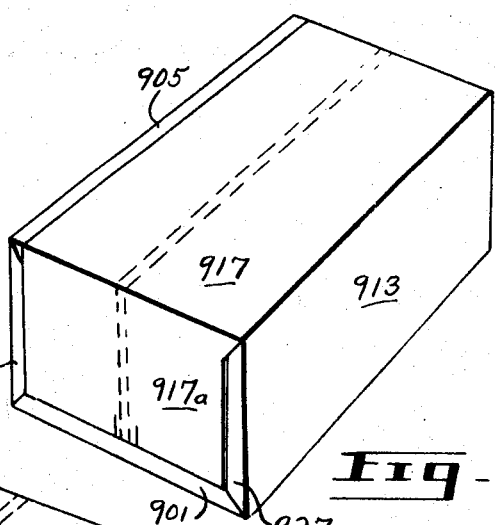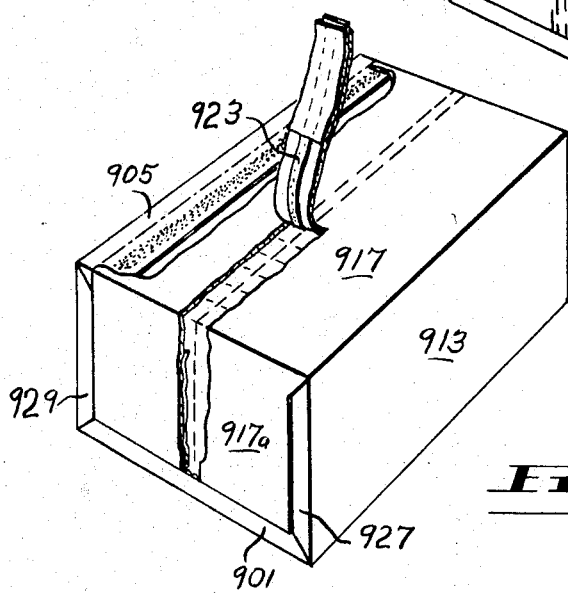

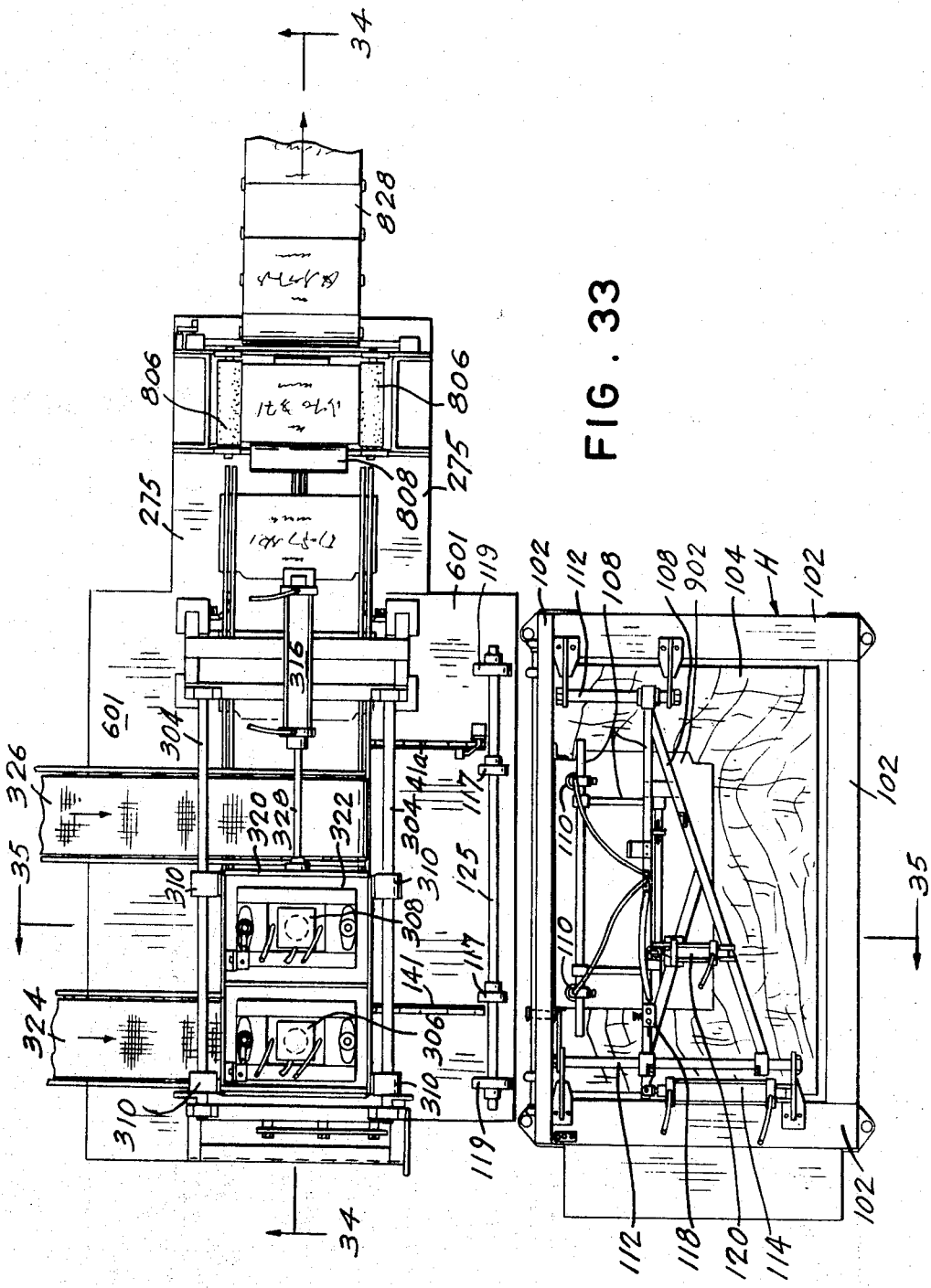

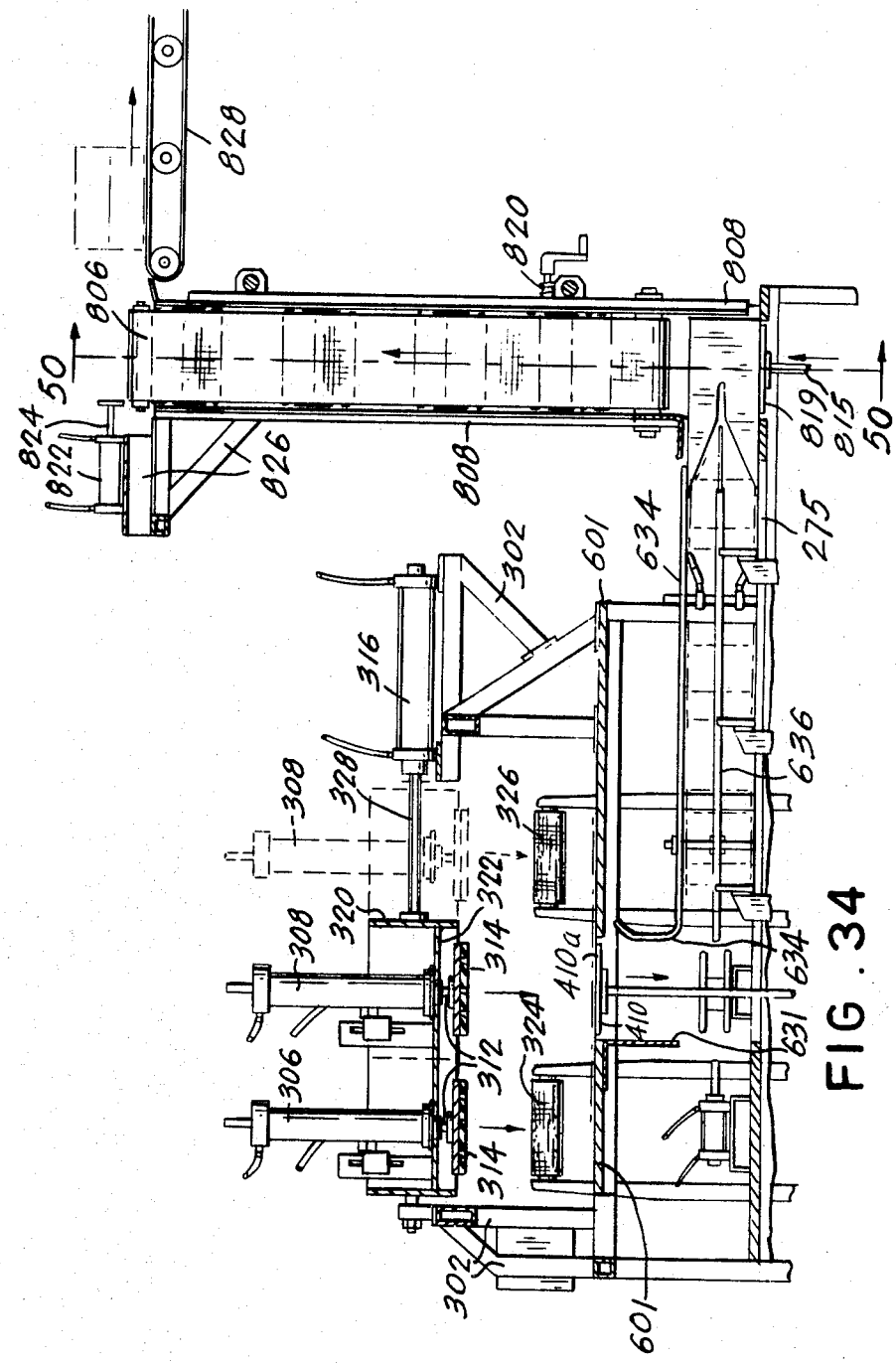

Sept. 29, 1970 W. HOFFMANN 3,530,640
BUNDLING MACHINE
Filed Oct. 6, 1966 16 Sheets-Sheet 12

FIG. 35

INVENTOR
Wolfgang HOFFMANN

ATTORNEY

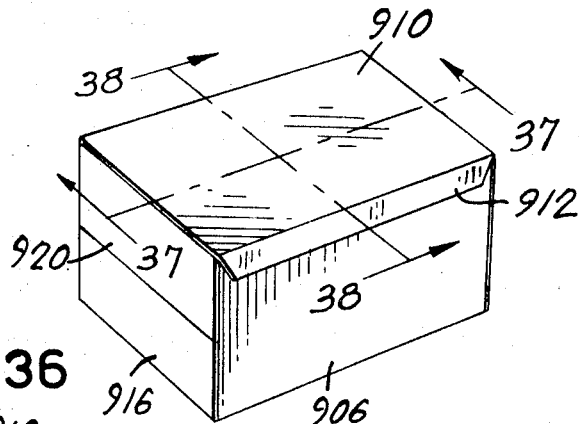
FIG. 36
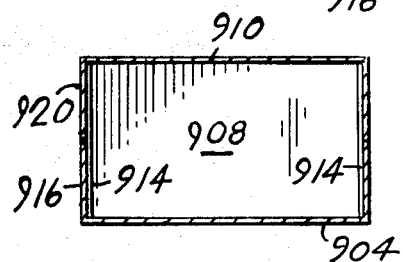
FIG. 37
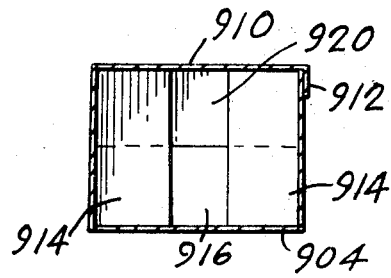
FIG. 38
FIG. 39
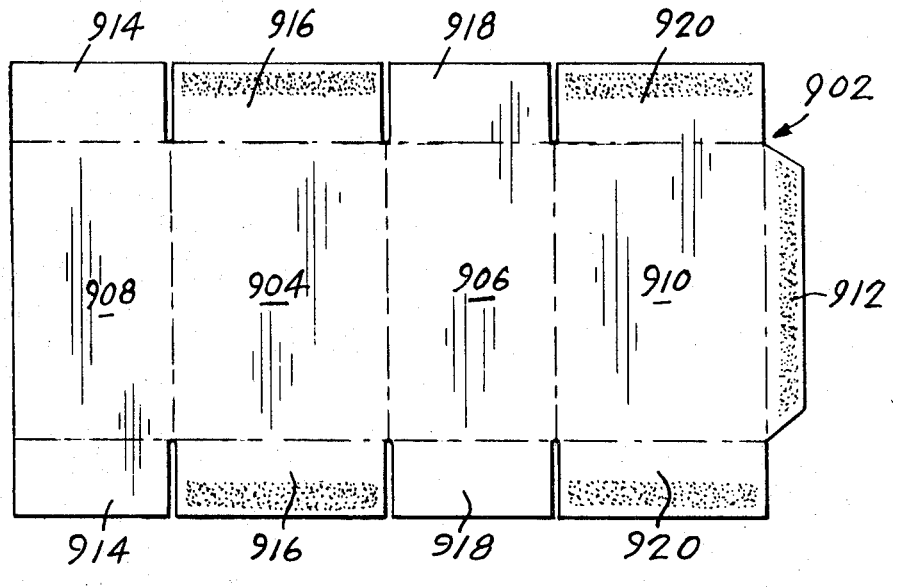

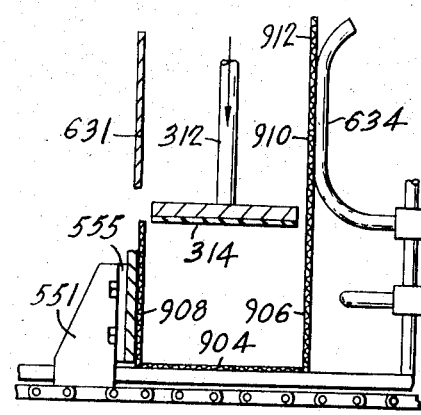
FIG. 40
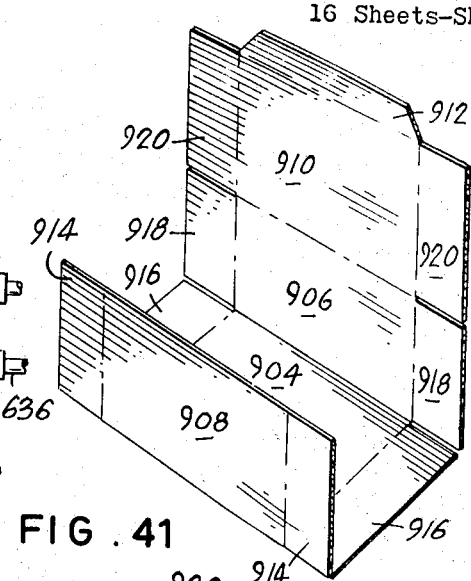
FIG. 41
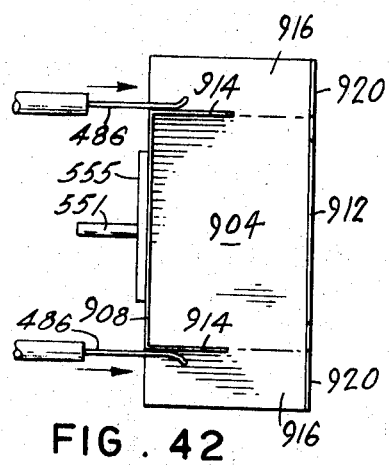
FIG. 42
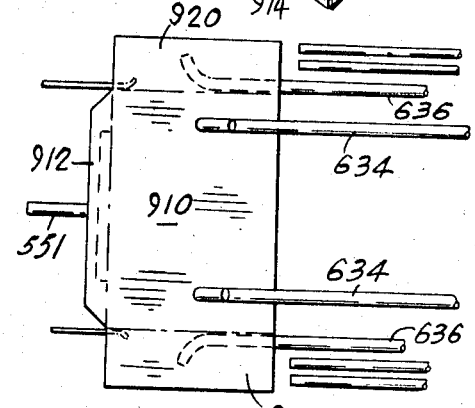
FIG. 44
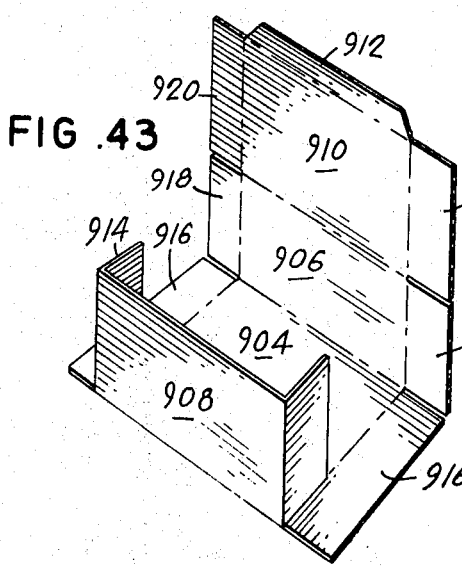
FIG. 43
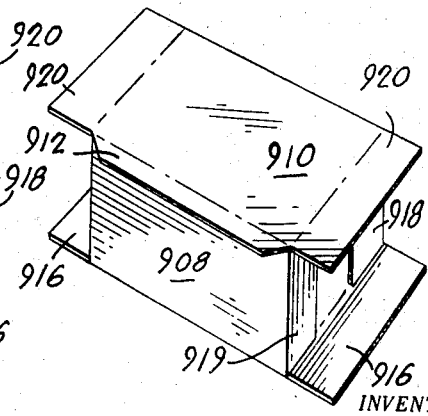
FIG. 45

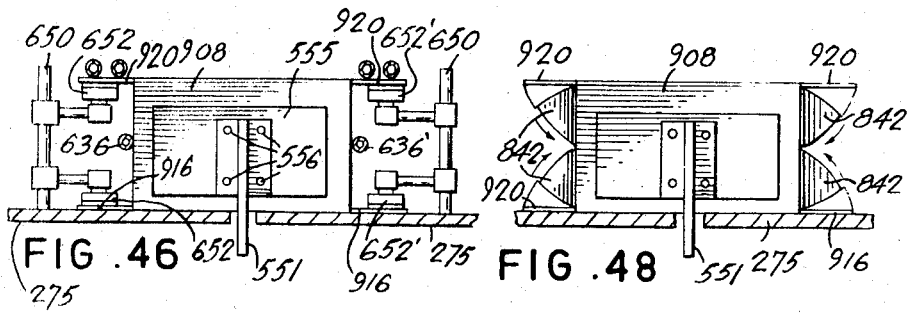
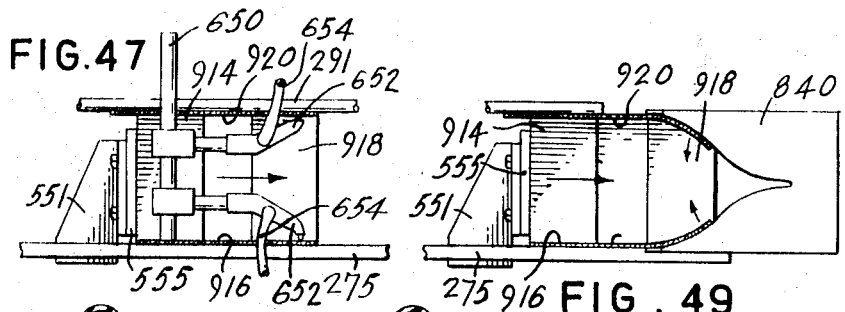
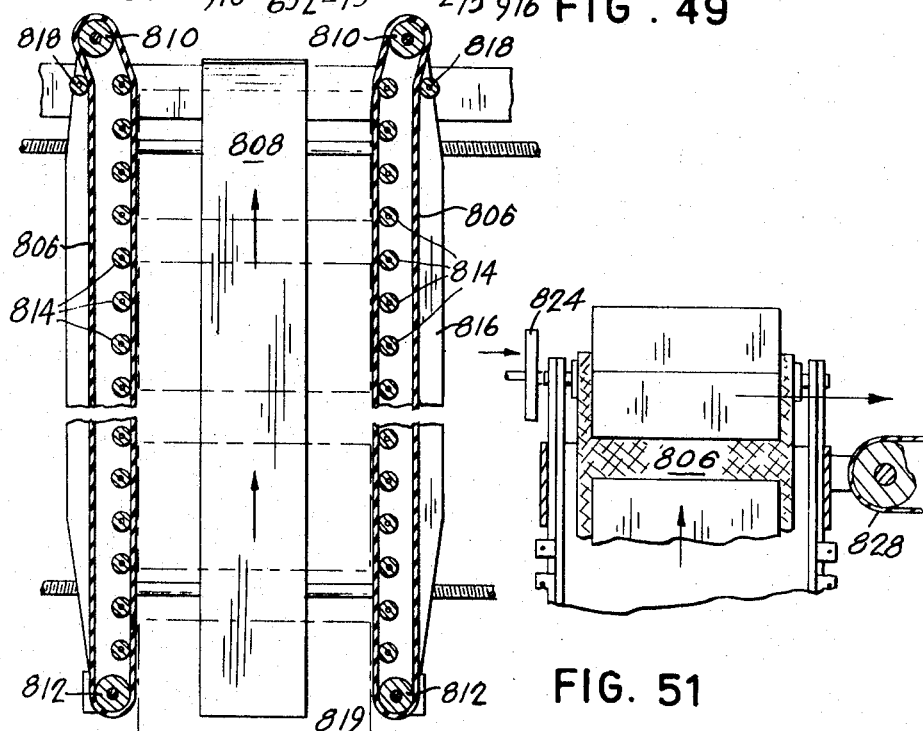
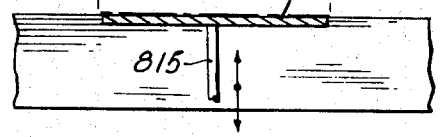

Sept. 29, 1970 W. HOFFMANN 3,530,640
BUNDLING MACHINE
Filed Oct. 6, 1966 16 Sheets-Sheet 16
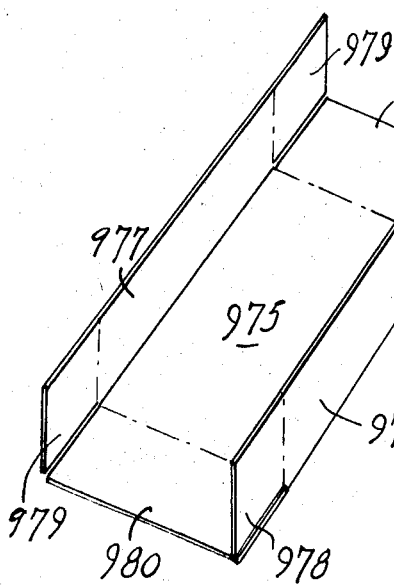
FIG. 52
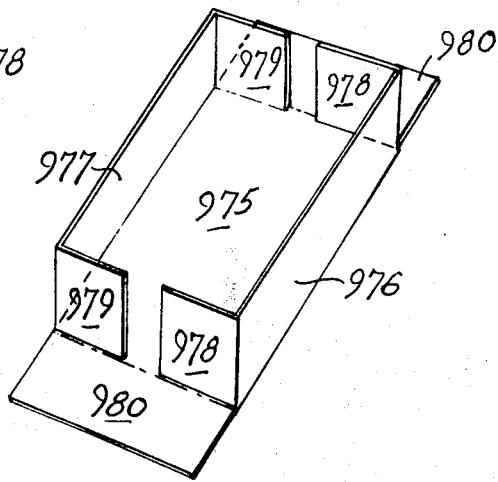
FIG. 53
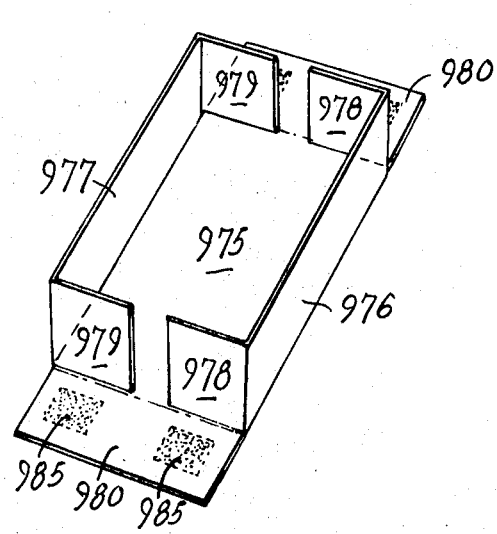
FIG. 54
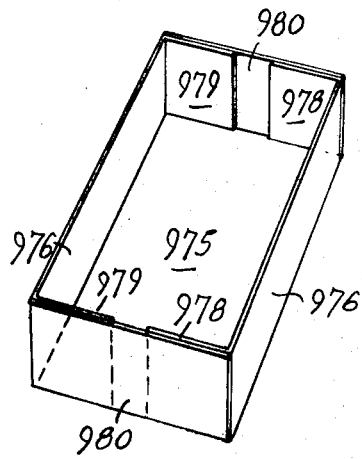
FIG. 55
INVENTOR
Wolfgang HOFFMANN
ATTORNEY

United States Patent Office 3,530,640
Patented Sept. 29, 1970

3,530,640
BUNDLING MACHINE
Wolfgang Hoffmann, Beaconsfield, Quebec, Canada, assignor to Canadian International Paper Company, Montreal, Quebec, Canada
Continuation-in-part of application Ser. No. 416,929, Dec. 8, 1964, now Patent No. 3,354,600. This application Oct. 6, 1966, Ser. No. 584,817
Claims priority, application Canada, Oct. 9, 1964, 913,682
Int. Cl. B65b *11/18, 13/20, 61/24*
U.S. Cl. 53—124
22 Claims

ABSTRACT OF THE DISCLOSURE

Apparatus for continuously packaging commodities, generally under compression, including upper and lower stations or platforms and an elevator operable therebetween and in conjunction with a commodity retaining pusher, wrapper and commodity feeding components for orienting a wrapper and commodity on the elevator at the upper station whereafter they are transported and formed in compact relationship as they are moved to the lower station and thereafter wrapper-tucking folding is accomplished to complete the package generally at the lower station.

---

This application is a continuation-in-part of my earlier filed application Ser. No. 416,929, filed Dec. 8, 1964, now Pat. No. 3,354,600, issued Nov. 28, 1967.

This invention relates to a method and apparatus for wrapping commodities and to a new package.

This invention readily lends itself to wrapping commodities under compression—"compression bundling"—but is also applicable to wrapping commodities not under compression.

There are many known methods and apparatuses for wrapping commodities under compression or otherwise. In general these methods wrap a commodity by applying a sheet of wrapping material to the top of a commodity, and subsequently juxtaposing the various side and bottom panels to respective sides and bottom of the commodity. More specifically, a commodity to be wrapped is normally placed on a platform which is adapted to be moved vertically upwardly between supporting members. These members are adapted to support the edges of the wrapping material and when in use the platform moves upwardly to thrust the top surface of the commodity against the undersurface of the wrapping material. The commodity continues to move upwardly after contact between the material and the commodity, and is pushed into, for example, a downward open forming box, the depending edges of which juxtapose the wrapping material to the sides of the commodity. This box may be replaced by any frame which serves to urge the parts of the wrapping material against the sides of the commodity as the commodity moves upwardly with respect to the frame. Transversely acting slides may complete the wrapping by urging the flaps of material which project below the commodity inwardly against the underside of the commodity.

In another aspect of applicant's development, the first and second stations preferably comprise a pair of vertically spaced apart horizontal platforms. In this embodiment, applicants contemplate the provision of a pair of registering apertures in the upper and lower platforms of a dimension sufficient to accommodate the elevator platform whereby the elevator platform operates from the surface of the upper platform to lower a commodity placed on a wrapper thereat to the lower platform, during which parts of the wrapper are juxtaposed to the commodity.

According to a further aspect of applicant's invention, the apparatus may include a component comprising retaining means for retaining a commodity in register on the wrapper, which in turn, is on the elevator platform, as the elevator platform descends with the commodity and wrapper from the upper to the lower station. This aspect of applicant's invention is desirable when the commodity to be wrapped is not sufficiently heavy to retain its own position on the wrapper without shifting, or alternately and in some cases, when a commodity is being wrapped under compression. A preferred component for use in this aspect of the invention comprises a "shoe" adapted to abut the top of the commodity, and means for causing movement of the shoe in timed-relationship to the movement of the elevator means whereby the shoe travels in unison with the elevator during the downward movement of the latter from the upper station to the lower station.

Depending on the particular type of apparatus, disadvantages crop up in that the different types of wrapping material, and different types of commodities cannot be wrapped in the same apparatus. Normally a single apparatus is useful for specific commodities and specific wrapping material and, it becomes an expensive proposition to attempt to wrap a plurality of different commodities with the use of several apparatuses. Further, these apparatuses are complicated in that additional components must normally be added for performing certain preliminary or finishing operations.

According to one aspect of this invention, applicant has provided an apparatus which overcomes the above disadvantages and provides many advantages in its own respect. Applicant's apparatus includes the components of upper and lower stations, means movable between the upper and lower stations adapted to lower a commodity placed on a wrapper at the upper station to the lower station, means for placing the wrapper on the means movable between the upper and lower stations when the movable means is at the upper station, means for placing a commodity on the wrapper and means for juxtaposing parts of the wrapper to the commodity as the means which is movable downwardly between the upper and lower stations moves therebetween.

According to a preferred aspect of applicant's development, the means movable downwardly from the upper to the lower stations comprises a horizontal elevator platform, desirably made up of a pair of spaced apart parcels mounted in horizontal relationship and operable in unison.

Any suitable means for delivering the commodity onto the wrapper can be employed as will be understood by those skilled in this art upon reading this disclosure. Thus, for example, there may be employing means for horizontally delivering the commodity to the wrapper and onto a predetermined position thereon. Alternately, it may be desirable to provide means mounted in a vertical fashion to vertically lower or "drop" the commodity onto the wrapper. Still further, a combination of the above two arrangements may be desirable in some instances.

The means between the upper and lower stations for juxtaposing the portions of the wrapper to the commodity, as the elevator means lowers the commodity in juxtaposition on the wrapper, desirably comprises a plurality of walls forming the outline to a chamber through which the elevator platform passes with the commodity and wrapper thereon. Still further, these walls forming a "chute" are desirably adjustable to accommodate varying commodity sizes or alternately, to wrap a commodity under compression. Depending on the specific type of wrapping material employed and/or compression or non-compression wrapping of the commodity, the specific arrangement of the walls forming the "chute" will vary as will be evident from the following description and will be understood by those skilled in this art. Thus, in some instances, it is only necessary to provide one opposed pair of walls defining a "chute" if it is only desired to juxtapose the wrapper to one opposed pair of panels of the commodity.

The means for placing the wrapper on the elevator component may be any suitable component capable of performing this operation. For example, automatic wrapper bundling and cutting means can be employed to deliver a wrapper to the elevator platform from a roll to the wrapping material, or alternately, a component for placing a wrapper on the elevator platform from a stack of wrappers can be used. Applicant prefers to employ a component capable of delivering a single sheet of wrapping material from a roll thereof.

The component for juxtaposing the balance of the wrapper preferably comprises a two-section arrangement. The first section is preferably located on the lower station and includes means defining a restricted passageway, means for advancing the partially wrapped commodity from the elevator platform when it is at the lower station and into the means defining the restricted passageway. The second portion of the means for placing the balance of the wrapper against the sides and top of the commodity can either be a vertically mounted component or a horizontal equivalent. A preferred aspect for use in this respect comprises a pair of vertically mounted movable belts in opposed relationship, and a pair of "shoes" or guides at least one of which is adjustable which together define a vertical enclosure through which the wrapped commodity is passed. In this arrangement, applicant provides means for receiving and elevating a commodity from the means defining a restricted passageway whereby the commodity is placed into gripping arrangement with the opposed belts. To this end, applicant provides positive drive means adapted to drive the belts upwardly with a low gearing ratio whereby the belts are prevented from moving downwardly by the weight of the wrapped commodity. Operating in conjunction with the means defining a vertical enclosure are an opposed pair of guide panels adapted to juxtapose the top flaps of the wrapper to the respective sides of the commodity, and a single front guide panel to juxtapose the front flap to the front panel of the commodity.

Applicant's apparatus also provides means for removing the commodity from the top of the enclosure. Any suitable means can be provided for this purpose, including for example, a horizontal conveyor connected to the enclosure and means for pushing a wrapped commodity onto engagement with the horizontal conveyor.

The means defining the restricted guideway through which the partially wrapped bundles are passed preferably comprises a pair of opposed vertically mounted guide plates, a bed defined by a horizontally displaced plate and a ceiling defined by parallel guide plates. Means are provided for moving the partially wrapped commodity from the elevator platform on its lower station, and preferably comprises a pair of endless belts mounting a plurality of spaced-apart pushing means adapted to abut the commodity and advance the same into and through the restricted guide channel and into operative engagement with the elevator arangement of the ceiling component. However, it will be understood that other suitable arrangements may be employed, such as for example, a piston rod arrangement whereby the piston rod abuts a package and pushes it through the means defining the restricted chamber.

According to the method aspect of this invention, applicant has now provided a novel method of producing a wrapped commodity which overcomes the disadvantages of the prior art methods and which has, at the same time, advantages. For example, the method of this invention provides more simple procedures, with fewer steps, a more economical operation resulting in greater economy, a more efficient and faster operation, etc.

Thus, in accordance with this invention, applicant's method includes placing a commodity to be wrapped on a wrapper having a size sufficient to envelope the commodity, juxtaposing the wrapper against at least the front and rear panels of the commodity so that at least at one end panel of the commodity the wrapper extends above the top of the commodity, juxtaposing the portion of the wrapper extending above the top of the commodity so that on both top sides of the commodity portions of the wrapper extend outwardly from the commodity, and subsequently juxtaposing the outwardly extending top flaps to the side panels of the commodity.

The specific type of method employed with the scope of the above will vary according to the type of wrapping material employed, the nature of the commodity to be wrapped, the specific geometrical configuration of the commodity, etc. Thus, for example, if a wrapper of corrugated board or similar type is used, applicant has found it is desirable that the method of this invention juxtapose the wrapper against both end panels of the commodity so that the wrapper substantially covers the front end panel and extends a distance above the top of the rear end panel to provide surplus wrapper sufficient to be juxtaposed to the top of the commodity and extend beyond the front end panel to overlap the portion of the wrapper juxtaposed to the front end portion to provide a flap securable to the last mentioned portion of the wrapper.

According to a further embodiment of applicant's method using a corrugated board wrapper or similar material, the wrapper is juxtaposed to the side panels of the commodity, preferably substantially simultaneously with the juxtaposition of the wrapper to the end panels, and preferably to an extent where the wrapper extends between about ⅓ to about ⅔ (desirably ½) the distance from the bottom of the commodity to the top thereof. In such cases, it is therefore desirable that applicant's method, when the portion of the wrapper extends above one of the end panels of the commodity which is subsequently juxtaposed to the top of the commodity, provide outwardly extending top side flaps of the wrapper which are complementary to portions of the wrapper juxtaposed to a portion of the respective side panels which extend from the bottom of the commodity towards the top thereof. The term "complementary" is used to denote that the two portions of the wrapper which constitute the wrapper juxtaposed to the sides of the commodity substantially meet or may overlap one another in sealing arrangement. However, this invention also contemplates the situation where one continuous portion of the wrapper completely covers the side panels of the commodity. In this case, one continuous portion may emanate from either the top portion of the wrapper which is juxtaposed to the top of the commodity or alternately may emanate from the bottom portion of the wrapper.

In an alternate procedure of the above method, this invention also contemplates providing a wrapper whereby when the wrapper is juxtaposed to the front and rear end panels, there are provided corner flaps of the wrapper extending outwardly from the respective sides of the commodity. In this situation, applicants prefer to juxtapose the corner flaps to the sides of the commodity prior to juxtaposition of the side panels of the wrapper to the respective sides of the commodity. Although applicant prefers to use four corner flaps, it is to be understood that either the front or rear pairs of corner flaps can be eliminated and the remainnig pair enlarged in width sufficient to replace the eliminated pair. In this arrangement, the corner flaps provide a "base" for securing the panels of the wrapper which are juxtaposed to the side panels of the commodity.

The preferred method of this invention using a corrugated board or similar wrapper therefor comprises placing a commodity on a blank wrapper having sufficient dimensions to envelope the commodity in such a manner, or alternately by aligning the commodity thereon, to provide (1) a front portion of the wrapper sufficient to cover a substantial portion of the front end panel of the commodity and to project laterally beyond the sides of the commodity equally to form front corner flaps; (2) a rear portion of the wrapper sufficient to cover the rear panel of a commodity and provide a top panel to cover the top of the commodity and at the same time provide equal rear corner flaps and equal top flaps extending from the top panel; and (3) equal panels extending outwardly from the sides of the commodity of a width sufficient to be complementary to the top flaps. In the next step, the front and rear panels of the wrapper are juxtaposed to the respective front and rear panels of the commodity, followed by juxtaposition of the respective complementary panels of the wrapper to the sides of the commodity. The front and rear corner flaps are then juxtaposed to the sides of the commodity. In the following step, the surplus of wrapper extending above one of the front or rear panels of the commodity is folded down on the top thereof. Following this, applicant then juxtapose the top flaps extending outwardly from the top panel to the respective sides of the commodity with the forward edge of the top panel being juxtaposed into sealing engagement with the other of such front or rear panels previously juxtaposed to the front or rear of the commodity.

The method of this invention as above described is preferably carried out by passing a wrapper containing the commodity from a restricted passageway whereby portions of the wrapper are juxtaposed to the sides of the commodity. If the restricted passageway is composed of pairs of opposed shoes the wrapper will be juxtaposed to all four sides of the commodity. After passing through the restricted passageway, the partially wrapped commodity is then passed through a further restricted passageway whereby the side flaps and the flap forming a sealable arrangement with the front end flap are subsequently juxtaposed to the respective portions of the commodity thereby producing a wrapped bundle.

Depending on the specific method used, the nature of the wrapper will vary accordingly. In the preferred aspect of this invention, the method employs a substantially rectangular wrapper provided with opposed pairs of slits therein laterally extending out from the respective sides of the commodity. Preferably, crease lines defining the bottom face of the bundle are provided in the wrapper and particularly where the wrapper is of a corrugated board nature, the crease lines are desired.

The wrapper may be held in place by means of suitable adhesives, for example, hot melt adhesives or contact-type adhesives. Alternately, adhesive tapes may be used which may either be preapplied to the wrapper or applied during the wrapping operation. According to preferred aspects, applicant applies, adhesives during the operation to portions of the surplus wrapper which overlap one another, namely the manufacturing joint which is probably located on the front panel in addition to the complementary side flaps.

The product resulting from the above methods possesses many advantageous features, among which are; the commodity is securely wrapped presenting a compact article, a plurality of individual articles may be packaged as in array to result in a wrapped commodity having a high degree stability; the wrapped commodity presents a surface suitable for advertising or other purposes on at least three major faces of the article, etc.

Having thus generally described the invention, it will now be referred to in greater detail by reference to the accompanying drawings, illustrating preferred embodiments of the invention, and in which:

FIG. 4 is a vertical transverse sectional view of a portion of the paper advancing means of the paper feeding assembly;

FIG. 5 is an enlarged vertical sectional view of a component of the paper feeding assembly;

FIG. 6 is a top plan view showing the advancing mechanism for the paper feeding assembly;

FIG. 6a is a vertical cross section taken along the line 6a—6a of FIG. 6;

FIG. 7 is a vertical cross section taken along the line 7—7 of FIG. 6;

FIG. 8 is a vertical longitudinal cross section of the apparatus shown in FIG. 1;

FIG. 9 is an enlarged vertical transverse cross section taken along the line 9—9 of FIG. 8 illustrating the mechanism for advancing a partially wrapped commodity from the lowerator assembly to the elevator assembly;

FIG. 10 is a detailed perspective view of the component adapted to juxtapose a pair of side flaps and a top flap of the sheet-wrapping material to the commodity;

FIG. 14 is a transverse vertical cross section taken along the line 14—14 of FIG. 8 illustrating a portion of the lowerator assembly in conjunction with the commodity advancing assembly;

FIG. 15 is an enlarged vertical cross sectional view of a portion of the commodity advancing assembly;

FIG. 16 is a detailed plan view, partially in section, further illustrating the construction of the commodity advancing assembly;

FIG. 17 is an enlarged fragmentary plan view partially in section, illustrating the lowerator assembly drive means;

FIG. 18 is a longitudinal vertical view of the terminal end of the guide channel and the lower portion of the elevator assembly;

FIG. 19 is a transverse vertical cross section of the front feed end of the elevator assembly shown in FIG. 18;

FIG. 20 is a transverse vertical cross section of the middle portion of the elevator assembly showing the package-retaining means;

FIG. 21 is a perspective view showing the position of the commodity on the sheet wrapping material before the wrapping operation begins;

FIG. 22 illustrates the first step in the method of the application in which the sheet wrapping material is juxtaposed to the four sides of the commodity;

FIG. 23 illustrates the next step in which a top flap is applied to the top of the commodity;

FIG. 24 illustrates the next step in which the two rear corner webs of the wrapping material are juxtaposed to side walls of the commodity;

FIG. 25 is a top plan view of the partially wrapped commodity shown in FIG. 22;

FIG. 26 is a rear perspective view of the partially wrapped commodity shown in FIG. 24;

FIG. 27 is an enlarged section taken along the line 27—27 of FIG. 24;

FIG. 28 shows the next step in the method following that of FIG. 24 in which the front corner webs and the other top panel are juxtaposed to the respective sides and top of the commodity;

FIG. 29 is a front vertical view of the commodity resulting from the step shown in FIG. 28, shown as it passes through a glue assembly;

FIG. 30 is a partial top plan view of the commodity shown in FIG. 28;

FIG. 31 illustrates how the top side flaps are juxtaposed to the side walls of the commodity;

FIG. 32 illustrates the finished bundle;

FIG. 32a illustrates the method of removing the commodity from the bundle;

FIG. 33 is a top plan view, certain components having been removed, of a modified apparatus according to an alternate aspect of this invention, capable of packaging commodities in a corrugated board wrapper;

FIG. 34 is a vertical cross section taken along the line 34—34 of FIG. 33 showing a side view of the modified apparatus;

FIG. 35 is a vertical cross section taken along the line 35—35 of FIG. 3 showing certain assemblies in greater detail;

FIG. 36 illustrates the resulting product consisting of a plurality of commodities wrapped in a corrugated board wrapper;

FIG. 37 is a vertical cross section taken along the line 37—37 of FIG. 36;

FIG. 38 is a vertical cross section taken along the line 38—38 of FIG. 36 (with the commodities removed from the package);

FIG. 39 is a plan view of a corrugated board wrapper used according to this aspect of the invention, the wrapper being shown in "layout" form;

FIG. 40 is a vertical cross section showing the manner in which the commodity is passed down through the compression chute into engagement with the commodity advancing means;

FIG. 41 illustrates the form the corrugated board wrapper assumes when it arrives at the lower platform;

FIG. 42 illustrates the mechanism for juxtaposing one pair of end flaps to the respective sides of the commodity when the latter is at the lower platform;

FIG. 43 illustrates the form the corrugated board wrapper assumes when it has been acted on by the mechanism of FIG. 42;

FIG. 44 illustrates the mechanism for juxtaposing the top panel of the corrugated board wrapper to the commodity;

FIG. 45 illustrates the form the corrugated board wrapper assumes after it has been acted on by the mechanism of FIG. 44;

FIG. 46 illustrates the glue applying means where portions of the wrapper are coated with an adhesive;

FIG. 47 illustrates in greater detail the mechanism of FIG. 46;

FIG. 48 illustrates the manner in which the side flaps of the corrugated board wrapper are juxtaposed to the respective sides of the commodity;

FIG. 49 is a side view of the mechanism of FIG. 48;

FIG. 50 illustrates an alternate form of the means for removing the packaged commodity from applicant's apparatus;

FIG. 51 illustrates the manner in which the commodities are removed from the mechanism of FIG. 50;

FIG. 52 is a perspective view of an alternate embodiment of this invention showing an open-topped package produced by the method and apparatus of the previously-described figures;

FIG. 53 is a view similar to that of FIG. 52 but showing the next step in the operation of forming the container;

FIG. 54 is a similar view to FIG. 53 but showing a further step; and

FIG. 55 is a perspective view of the container thus formed.

Figure 1:
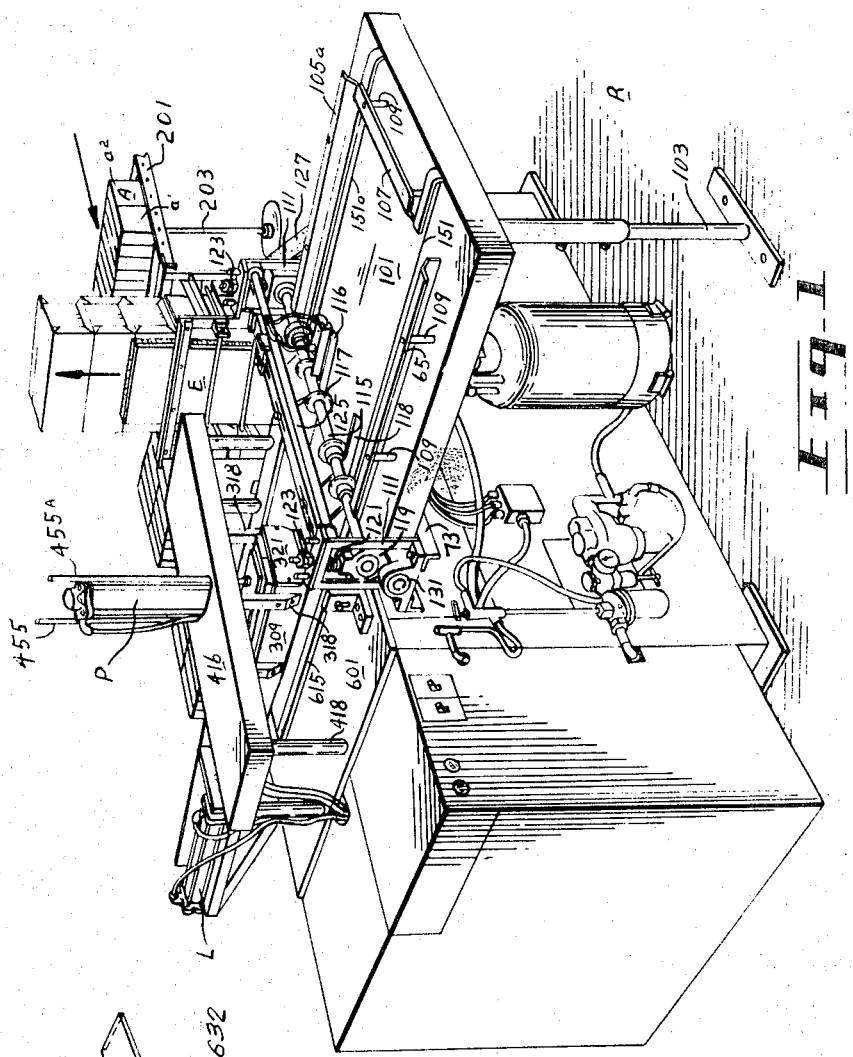
FIG. 1 is a perspective view of an apparatus according to this invention.

In the accompanying drawings, reference will first of all be made to FIGS. 1 to 32a inclusive, showing one embodiment of an apparatus according to this invention. Further, for simplicity, reference will be made to the several individual assemblies of the apparatus.

In FIGS. 1 to 32a, the apparatus and its method, the resultant article, relates to the embodiment where a plurality of commodities, suitably in array thereof, is packaged in a flexible sheet wrapper.

UPPER PLATFORM

The upper platform serves to indirectly or directly mount several of the assemblies of the apparatus, including the pusher P of the lowerator assembly, the paper feeding assembly, the loader assembly L, etc. Particular reference is made to FIGS. 1, 2, 4, 8 and 14.

More particularly, the upper platform is associated with a lower platform, designated by reference numerals 601 and 275 respectively, both of which are mounted on a vertical parallel relationship by means of frame members 51 and 51a. The upper platform 601 comprises a retangular supporting surface 601a and includes a central rectangular aperture 603 therein and supports 418 therein mounting a portion of the lowerator assembly frame 416 in registry over aperture 603, both of which will be described in detail later with regard to the lowerator assembly.

Surrounding aperture 603 on all sides thereof are downwardly extending vertical guide plates 605 (FIGS. 8 and 14) connected to the underside of the upper platform 601 by brackets 607. The guide plates 605 extend to a point above the lower platform 275, and are slightly curved, as at 605a, at their juncture to the upper platform 601, for a purpose which will be subsequently described.

The platform 601 is adapted to operate in conjunction with the paper feeding assembly. To this end, the platform 601 includes a pair of laterally spaced apart guides 615 rigidly mounted on either lateral side of aperture 603 to define a wrapping material receiving area. A pair of gripping clamps 611 are mounted on platform 601 on one longitudinal side of the aperture 603, defining the terminal point of advancement of the wrapping paper blank advanced by the paper feeding assembly to the wrapping material receiving area. The purpose and nature of clamps 611 and guides 615 will be discussed in greater detail with reference to the paper feeding assembly.

LOWER PLATFORM

Figure 11:
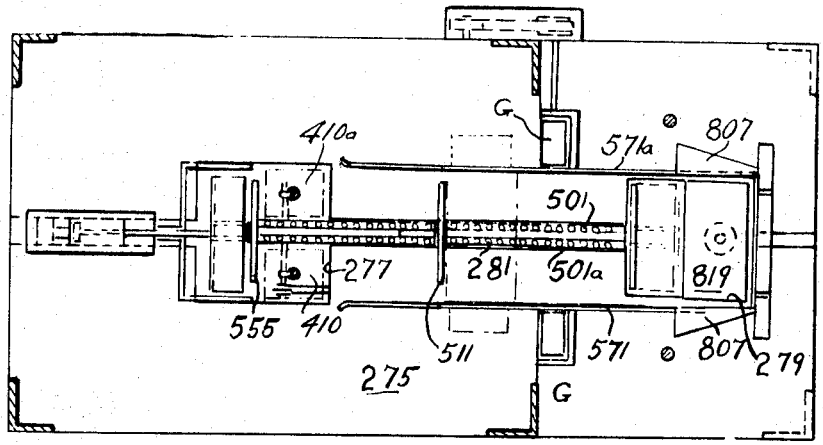
FIG. 11 is a horizontal cross section taken along the line 11—11 of FIG. 8 illustrating the lower platform and several of the components it mounts.

The lower platform comprises a rectangular supporting surface 275 indirectly or directly mounting several additional components of the apparatus including the lowerator assembly K, the commodity-advancing means, gluing means, etc., all of which will be subsequently described in detail. Reference now is made to FIGS. 8, 11 and 14.

The lower platform 275 is horizontally mounted on frame members 51, and supports frame members 51a. It includes a rectangular aperture 277 therein in registry with aperture 603 of the upper platform 601. The function of aperture 277 will be discussed with regard to the lowerator assembly K. The platform 275 also includes a second rectangular aperture, spaced from aperture 277, the function of which will be described with regard to the elevator assembly. Joining the two apertures 277 and 279 is a third elongated aperture 281, to be discussed with regard to the commodity advancing assembly.

CONVEYOR ASSEMBLY

Figure 2:
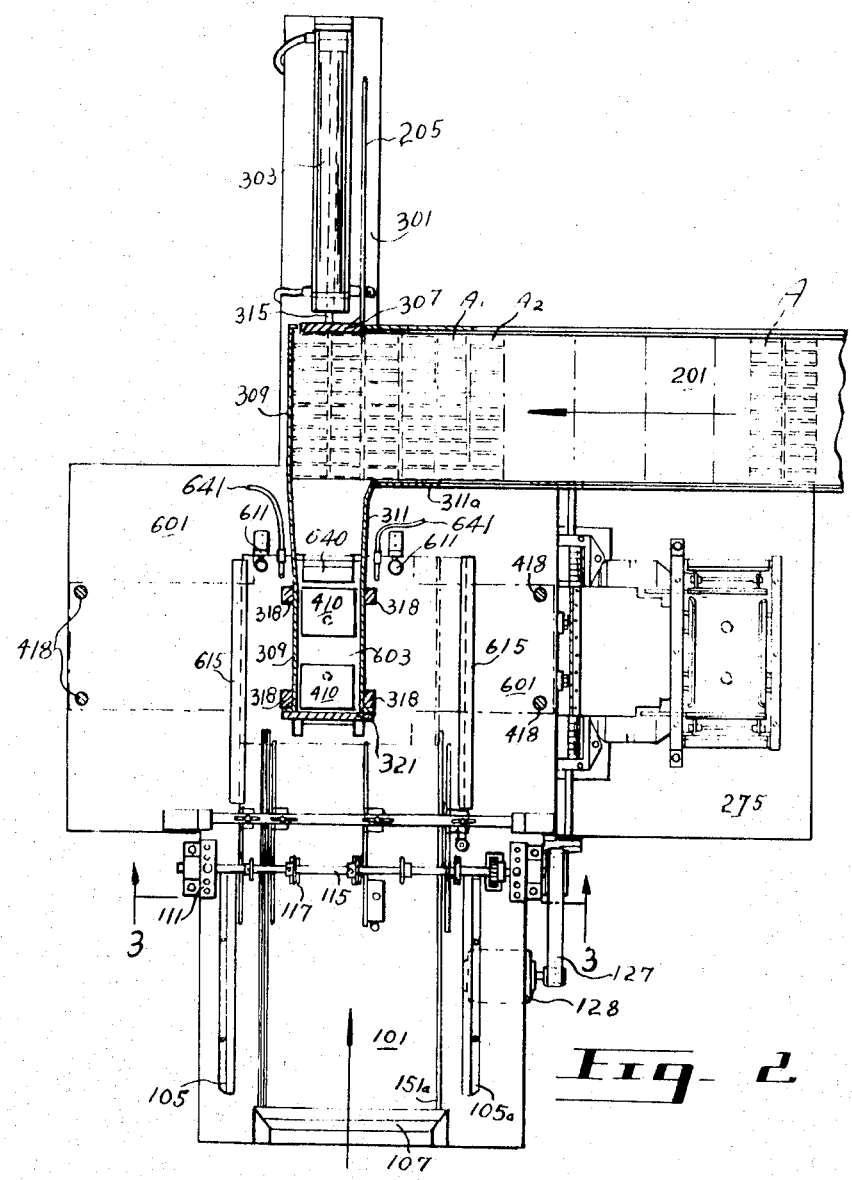
FIG. 2 is a top plan view of the apparatus of FIG. 1 with certain portions of the lowerator and elevator assemblies removed for a clearer view.

This assembly serves to transport a commodity, which may be a plurality of separate articles grouped to form an array A as shown in the drawings, from a previous operation (for example packaging) to a loader component L. Reference will be made to FIGS. 1 and 2 of the drawings.

In more detail, the conveyor assembly comprises a conveyor 201 mounted on supporting leg 203 resting on the floor R. The conveyor 201 terminates (in the forward direction of movement) at a supporting surface 301 forming part of the loader assembly L. Suitable means (not shown) are provided to drive the conveyor 201.

Operating in conjunction with the conveyor 201, and the loader assembly L, is a laterally reciprocating barrier 205, located at the terminal end of conveyor 201 on supporting surface 301. The barrier 205 is adapted to move transversely to the conveyor 201, whereby when the conveyor delivers an array A to the supporting surface 301 of the loader assembly L, additional arrays are prevented from entering the loader assembly L. Any suitable means for reciprocating the barrier 205 may be provided, as for example, a limit switch.

PAPER FEEDING ASSEMBLY

This component serves to supply individual sheets of creased material to the wrapping material receiving area defined by guides 615 and clamps 611 of the upper platform 601 and in registry with the aperture 603. Specific reference will be made to FIGS. 1 to 7.

According to the embodiment shown in the drawings, this component includes a supporting surface 101, a lateral extension of the upper platform 601, which is supported by a leg 103 resting on the floor R. A pair of transverse guides 105 and 105a and a lateral guide 107 on its surface define therebetween an area to place a supply of sheet material for wrapping the commodity. The guides 105 and 105a, and 107 are mounted by means of posts 109.

A first shaft 115, carrying a plurality of creasing rollers 117 (depending on the number of creases desired) is rotatably mounted at both ends thereof in a pair of bushings 119, which in turn, are mounted in a pair of spaced apart end frames 111 connected to a sub-frame member 73 of the apparatus. The end frames 111 are joined by a cross member 125. The bushings 119 are spring-loaded in their respective frames 111 by springs 121 and bolts 123.

Figure 3:
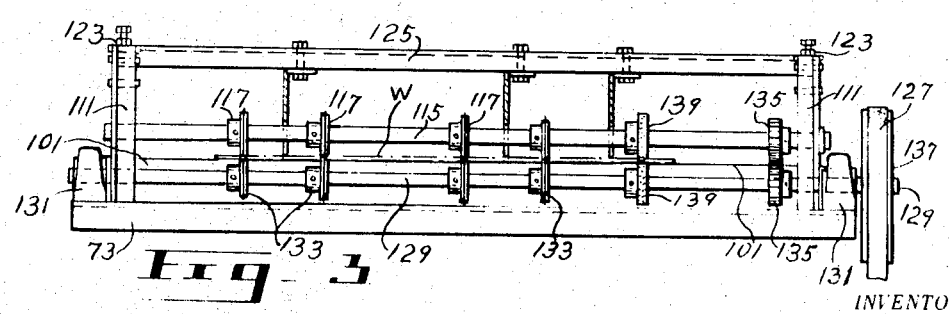
FIG. 3 is a vertical longitudinal cross section taken along the line 3—3 of FIG. 2 illustrating a portion of the paper feeding assembly.

Cooperating with the first shaft 115 is a second shaft 129, located beneath the supporting surface 101 and rotatably journalled in bushings 131 mounted on the sub-frame member 73, (FIG. 3). The shaft 129 mounts a plurality of rollers 133, protruding through the apertures in the supporting surface 101, each mating with a roller 117 mounted on the first shaft 115. Each shaft 115 and 129 carries a toothed gear 135, meshing with one another. By adjusting the spring loaded shaft 115, different tensions for different degrees of creasing (depending on the type of wrapping material) can be exerted on a sheet of wrapping material W (shown in phantom lines in FIG. 3) as it passes between the rollers.

The shaft 129, protruding at one end through one bushing 131, is connected to a flywheel 137 mounted to an endless belt 127, driven by an electric motor 128 via a slipping clutch (not shown).

Means for advancing a single sheet of wrapping material W form the supporting surface 101 into the wrapping material receiving area defined by guides 615 and clamps 611 (and in registry with aperture 603) of the upper platform 601, are shown in detail in FIGS. 4 to 7. The advancing means includes a pair of endless chain belts 141 and 141a (on either lateral side of supporting surface 101) operating in conjunction with cooperating rotatable shafts 115 and 129. Endless belts 141 and 141a, located beneath supporting surface 101, operate in transverse channels 151 and 151a therein. Both shafts 115 and 129 include cooperating rollers 139. The upper roller 139 is associated with a device (not illustrated) for feeding glue onto the upper roller. The rollers 139 cooperate with belts 141 and 141a to push forward a sheet W of wrapping material through the scoring mechanism into the wrapping material receiving area. If desired a further pair of rollers 139 can be provided adjacent the other ends of the shafts 115 and 129 for gluing the underside of the sheet W.

The pusher component P is operated by a limit switch (not shown) which in turn, is activated by the piston rod 315 and pushing plate 307 of the loader assembly L on the terminal end of the latter stroke. The platform component K is also simultaneously activated by the the loader assembly L through a cam mechanism (not shown).

When activated, the pusher component P abuts the top surface of an array A to retain the array in alignment with the wrapping material as the supporting surfaces 410 descend from the upper platform 601 to the lower platform 275. Guides 605, mounted on the lower surface of platform 601 surrounding aperture 603, function to juxtapose the wrapping material to the respective sides of the array A. A pair of vertically mounted movable guide rods 455 and 455a, journalled in supporting framework 416 by means of bearings 456, are connected at one end thereof by rings 452 to the pushing plate 424, and serve to guide and position the movable plate 424 when reciprocating during its stroke.

The co-acting components P and K, from the above description, operate to lower an array A positioned on a sheet of wrapping paper W on supporting surfaces 410 from the upper platform 601 to the lower platform 275 while subjecting the array A and wrapping material W to the guide 605 thereby to juxtapose the wrapping material W against the side of the array A. There are guide plates 605 on every side of the array A as it is lowered on the lowerator. These plates do not extend to form corners with adjacent plates since allowance must be made for the pleats formed by the wrapping paper W at the corners.

Figure 14A:
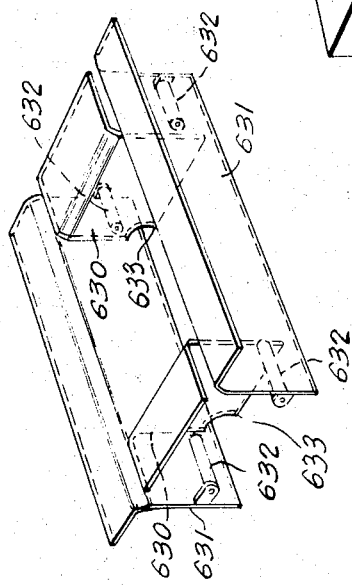
FIG. 14a is a respective view of a modified form of the "box" down through which the lowerator assembly carries the commodity.

The modified arrangement illustrated in FIG. 14a includes four guide plates 630 and 631 together defining the vertical channel down through which the array A is carried. Four rollers 632 are mounted on the interior surfaces of the plates but outside the vertical channel defined by plates 630 and 631. Each roller 632 is free to rotate about a horizontal axis and is mounted by means which have been omitted to avoid overburdening the drawing. It will be understood that the edges of the plates 630 are slightly spaced from the adjacent parts of the plates 631 to allow for the pleats formed at the corners of the wrapping material to project beyond the plates 630 to the region of the rollers 632.

The plates 630 are cut away at 633 for a purpose to be described hereinafter.

ADVANCING ASSEMBLY

The advancing assembly broadly includes three main components: an endless belt, a tucking assembly, and a guideway or channel (located on the lower platform 275) through which the endless belt passes and advances a partially wrapped commodity from the lowerator assembly K to the elevator assembly E. In describing this assembly, reference will be made to FIGS. 8 to 16 of the drawings.

The individual components of this mechanism are mounted on various sub-frame members, indicated by reference numerals 57 and 59 which in turn, are connected to the main frame 51.

The endless belt includes a pair of parallel identical chains denoted by the reference numerals 501 and 501a operating in unison and mounting a plurality of spaced apart pivotable hinges indicated generally by numeral 511 (as described hereinafter). The chains 501 and 501a, mounted on four pairs of sprockets 503, 504, 506 and 507 (FIGS. 8 and 12), define a quadrangular path of travel beneath the lower platform 275, the upper portion of the path running parallel to and in registry with the elongated aperture 281 and extending from aperture 277 to aperture 279 of the lower platform 275.

As described hereinafter, one of the sprockets 503 serves to drive chain 501, the other sprocket of this pair to drive chain 501a. Similarly, the chain 501 is also driven by the one of the sprockets of the pair 504 and the chain 501a is driven by the other sprocket of that pair. These sprockets are mounted on shafts 515 and 516 which in turn are rotatably journalled in extensions 525 of frame member 57 in a diagonally disposed relationship. Sprocket pairs 505 and 506 are similarly journalled on shafts rotatably mounted in extensions 526 or frame member 57.

Figure 12:
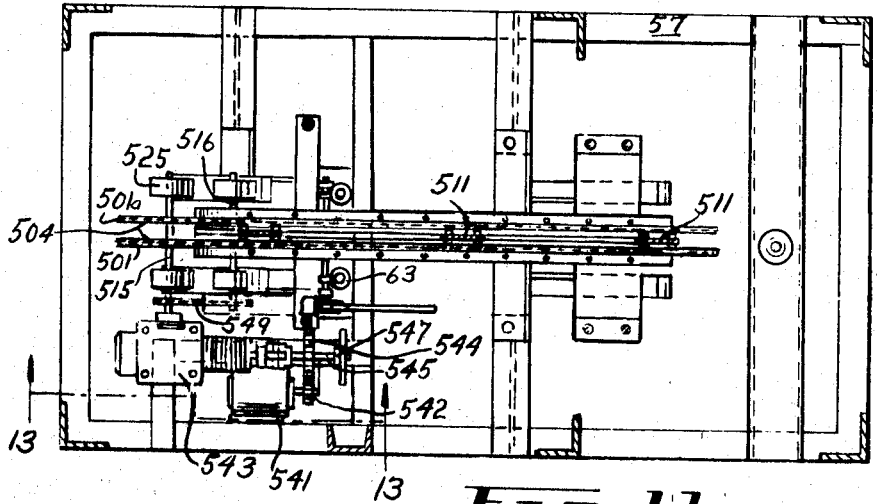
FIG. 12 is a horizontal section taken along the line 12—12 of FIG. 8 illustrating the drive mechanism for the commodity advancing means.
Figure 13:
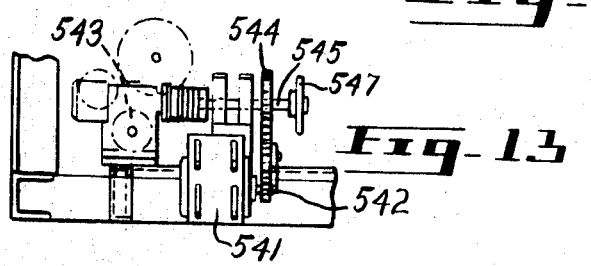
FIG. 13 is a vertical longitudinal cross section taken along the line 13—13 of FIG. 12 illustrating, in part, the drive mechanism for the commodity advancing assembly.

The drive means for the advancing assembly may be seen by reference to FIGS. 12 and 13. It includes an electric motor 541 connected to a toothed gear 542, which in turn drives a meshing gear 544 mounted on a drive shaft 545. One end of shaft 545 is connected to a speed reducing unit 543, the other to a handle 547 which permits adjustment of the torque transmitted through shaft 545. The speed reducing unit 543 is connected to the shaft 515 mounting sprockets 504. Shafts 515 and 516 each mounts a further sprocket, which in turn mounts a chain 549. Thus the speed reducer 543 (operated by electric motor 541) drives both shafts 515 and 516, turning both pairs of sprockets 504 and 503 simultaneously, which in turn, simultaneously drives the chains 501 and 501a.

Beneath aperture 281 of lower platform 275 and in registry therewith are a pair of longitudinally running vertically spaced-apart guides 561 and 561a (FIGS. 8 and 15), curving at one end in the rear of aperture 277 of lower platform 275 to attach to extension member 525 as at 562 and, at the other end, to extension member 526. Guides 561 and 561a are joined together with a cross member 564 by bolts 565. The two guide members 561 and 561a, at the edges, are connected to guide members 563 and 563a by means of stay bolts 567 separated by spacers forming a guide channel therebetween beneath the surface of lower platform 275 through which the chains 501 and 501a pass.

The endless chains 501 and 501a mount a plurality of longitudinally spaced-apart hinges 511 pivotably seated on a rod 553 rigidly journalled in parallel opposed links 501' and 501a' of the respective chains. The hinges 511 include a "keel" portion of 551 extending above and below the pivot. The upper portion of the keel 551 mounts a push plate 555, rigidly connected thereto by bolts 556. The lower portion of the keel is tapered, and mounts a pair of rotatable rollers 559. Horizontal guide plates 563 also mount small vertically disposed rollers 558 which guide the keel portion 551 of the hinge 511.

The chains 501 and 501a carrying hinges 511 passing through the channel defined by guides 561 and 562 cause the rollers 559 of the lower portion of the hinges 511 to strike the guide track formed by guides 561 and 563 at the point where the guide track curves and runs parallel to the lower platform 275. The push plate 555 of the hinges 511 are thus forced into a vertical position as the rollers are advanced through the guide track extending from aperture 277, through the opening of the spaced-apart supporting surfaces 410 along the guide track beneath aperture 271 to the elevator assembly E.

Vertically mounted on the lower platform 275 are a pair of spaced-apart panels 571 and 571a defining therebetween a vertical guide channel extending from the terminal portion 277 of the lowerator surfaces 410 and 410a in the forward direction of the movement of the array A to the elevator assembly E (FIG. 11). The guide panels 571 and 571a are tapered to converge to the elevator assembly E at their terminal end (FIG. 18), the purpose of which will subsequently be discussed with reference to the elevator assembly E.

Operating in conjunction with the commodity advancing means is a "tucking" component shown in detail in FIG. 10 adapted to juxtapose a top flap and a pair of rear corner pleats of the partially wrapped array A to the top and respective sides of the array A. This component includes a pair of vertically connected aligned pistons 475 and 477, the latter which is connected to a L-shaped bracket 478 rigidly mounted to the lower platform 275. The pistons 475 and 477 operate piston rods 479 and 481 respectively. Connected to a piston rod 479 is a L-shaped angle bracket 483, which when advanced, is adapted to juxtapose a top rear flap of the partially wrapped array to the top of the array. Piston rod 481 mounts a U-shaped bracket 485, which when advanced, is adapted to juxtapose a pair of rear corner pleats to the respective sides of the partially wrapped array.

The pistons 475 and 477 operate in conjunction with one another by means of a cam (not shown) whereby the L-shaped bracket 483 juxtaposes the top flap of the wrapping material to the top of the commodity while piston rod 481, with bracket 485, substantially simultaneously juxtaposes the rear side webs.

Mounted in conjunction with the vertically disposed side flaps 571 and 571a is a ceiling guide 291. Ceiling guide 291 is mounted so as to just clear the partially packaged array A, and juxtapose the front vertically extending flap against the top of the array in a manner to be described later. The ceiling guide 291 is substantially wider than the channel formed by the side panels in order to control the whole width of the top flap.

Operating in conjunction with the commodity-advancing means is a glue assembly G adapted to apply glue to certain flaps of the wrapping material. Specifically, the glue assembly G comprises a rotatable roller 293 horizontally disposed in a glue bath 295. Resilient flap 297 extends from the ceiling guide 291 to press the horizontally extending flaps onto the glue rollers. The roller 293 is driven by a chain 294 connected to suitable drive means (not shown).

ELEVATOR ASSEMBLY

An elevator assembly generally identified as E is adapted to receive an almost completely wrapped commodity from the commodity advancing means after it passes through the guide channels defined by panels 571, 571a and 291. Reference will be made to FIGS. 1, 8 and 11 and 18 to 20 in describing this assembly.

The elevator assembly E, in greater detail, includes a pneumatic cylinder 811 mounted against lower platform 275 and in alignment with aperture 279 thereof. Cylinder 811 operates a vertically reciprocating piston rod 815, which in turn mounts a supporting surface 819 of a dimension slightly less than that of aperture 279.

Mounted on a lower platform 275 in registry with aperture 279 and in operative association to the supporting surface 819 of piston rod 815 is a rectangular commodity-retaining enclosure 804 having a discharge opening generally identified by reference numeral 803. More particularly, the enclosure 804 is composed of a hollow top and bottom open-ended frame 800, mounted to the surface of the lower platform 275 and substantially closed in by panels 801 on all sides thereof. One side of the bottom 805 opens into the guide channel defined by guide plates 575 and 575a to permit a substantially wrapped array to advance onto the supporting surface 819. The bottom portion of the rectangular elevator shaft 804 on either longitudinal side thereof mounts a pair of curved converging panels 807, which form a continuation of panels 801 of the rectangular enclosure and guides 575 and 575a.

The rectangular enclosure 804, as shown in FIG. 20, is provided with means to retain the array as it is pushed up into the rectangular enclosure 804 by the supporting surface 819 of the elevator. The retaining means is composed of several pairs of opposed cooperating surfaces 821a, 821b and 821c, operated in unison by means of a bell crank lever 823. Each pair of gripping surfaces 821a is joined by a spring loaded connecting rod 825; all of the rods 825 being joined and operated in unison by connecting rod 827. A plurality of rollers 851, mounted to a support 69, are adapted to facilitate the elevation of a wrapped commodity A into the enclosure 804 as it is picked up by the elevator.

The commodity delivered to the elevator is lifted thereby to the level of the first locking surfaces 821a by the elevator platform 819. The distance between opposed pairs of surfaces 821a is normally less than the length of the package A. However, since the plates 821a are connected to bell cranks 823 and 824 which in turn are journalled in the bearings 818, the plates are pushed upwardly thus alowing the package to wedge between them. The elevator platform 819 then lowers to the level of platform 275 with the wrapped commodity A being suspended in the shaft 804.

The gravitational force of a wrapped commodity A, when the shaft 804 is against plates 821a, which in turn, transmits this force to bell crank 823. In turn, bell crank 823 rotates a bell crank 824 by means of a connecting rod 825 working against a spring 828 connected at one end to a rigid brace 827. Thus, the bell crank 824 transmits its torque into a reaction force against the wrapped commodity A retaining it in a suspended position.

As the subsequent package is pushed upwardly by the elevator platform 817, the first package is then pushed into a level between pairs of plates 821b causing the new pair to go through the same action simultaneously with the plates 821a which are now acting upon the second package. This continues in an upward direction for the whole length of the enclosures 804.

WRAPPING METHOD AND RESULTING COMMODITY

FIGS. 21 through 32 illustrate the various forms the commodity takes in the step-by-step method by which it is wrapped, as accomplished by the apparatus just described. In desscribing these figures, reference will be made to the various assemblies and components of the apparatus to facilitate understanding. As previously described, the form of the commodity A shown in the drawings is a plurality of individual packages assembled to form an array. Thus, it will be understood that this description is only an exemplification of the invention, and is not intended to be limiting in any manner.

The sheet of wrapping material includes crease lines 909, 931, 911 and 925 to facilitate wrapping, dividing the sheet S into five panels, and includes tear tape 923 and slits 927 on either side of the terminal ends of the tear tape. The crease lines 909, 931, 911 and 925 are made in the sheets of wrapping material by cooperating crease rollers 117 and 133 of the paper feeding assembly as the individual sheets are fed to the upper platform 601 by the latter assembly.

The panels 907 and 913, defined by crease lines 909 and 931, and 911 and 925 respectively, have identical widths corresponding to the height of the commodity A; panel 901 defined by crease lines 931 and 911, has a width corresponding to the width of the commodity; and the panels 905 and 917, defined by crease lines 909 and 925 and the respective ends of the sheet S have a combined width greater than the width of the commodity. The overall width of the sheet in this embodiment is less than the combined length and twice the height of the commodity. The overall width of the sheet in this embodiment is less than the combined length and twice the height of the commodity and the overall length more than the combined length of the top, bottom and sides of the commodity.

FIG. 21 illustrates the position assumed by the commodity A on a sheet S of wrapping material, when the commodity A is advanced and aligned on it by the leader assembly L in the first step. The commodity is centered on the panel defined by crease lines 931 and 911 leaving on either side a pair of longitudinal side panels 901 and 901a, each having a width slightly less than the height of the commodity.

In the subsequent step, the panels 907, 901, 901a and 913 are juxtaposed to the respective sides of the commodity A and assume the form shown in FIGS. 22 and 25. This is accomplished by means of the opposed pairs of plates 605 of the upper platform, which act on the commodity and the wrapping materials as the commodity is lowered from the upper platform 605 to the lower platform 275. In juxtaposing the respective side panels to the sides of the commodity, front and rear corner flaps 927 and 929 respectively are formed by the spaced-apart plates 605. In this respect, it will also be noted that panels 905 and 915 connected to panels 907 and 913 respectively, extend in a substantially vertical position from the latter, when the lowerator is at the lower platform 275. When the modified construction of FIG. 14a is employed, the corner flaps 927 and 929, which project from the vertical channel through the gap between the plates 620 and 631, pass between the plates 631 and the rollers 632. The rollers 632 are mounted sufficiently close to the plates 631 to cause the folds at the outermost ends of the pleats to be pressed so that these folds become sharp.

Following this, the rear panel 905 is subsequently juxtaposed to the top of the commodity A to assume the form shown in FIG. 23. This step is carried out by means of the piston assembly 475 and L-shaped bracket 483. At this stage, the top panel 905 protrudes beyond the respective top transverse sides of the commodity A forming a pair of equal top transverse side panels each having a width at least equal to or greater than the portion of the transverse sides of the commodity not covered by the side panels 901 and 901a.

Substantially simultaneous with the juxtaposition of panel 905 to the top of the commodity A, rear flaps 929 are juxtaposed to the side panels 901 and 901a of the commodity to form the partially wrapped commodity shown in FIGS. 24, 26 and 27. This latter step is carried out by the piston assembly 477 and U-shaped bracket 485 of this asssembly. A suitable gate (not illustrated) is provided which projects into the path of the commodity while the rear flaps 929 and rear panel 905 are being juxtaposed to the side panels 901 and 901a, and the top respectively. This prevents any movement of the commodity under the influence of brackets 483 and 485. The gate is returned in an inoperative position before the commodity is entrained by one of the push plates 555.

In the following step, the panel 917 and front corner flaps 927 are juxtaposed to the top of the commodity and side panels 901 and 901a, respectively. These two operations are carried out substantially simultaneously as the partially wrapped commodity is advanced through the guide channel by the commodity advancing means, and specifically by the horizontal plate 291 and opposed pairs of vertical plates 571 of the guide channel acting on the respective panels. At this stage, the top panel 917 forms a pair of front top transverse side panels extending on either side of the commodity A, designated by reference numerals 917a and as shown in FIGS. 28, 29 and 30. As the length of the sheet of wrapping material S is longer than the total length of the sides, top and bottom of the array, top panel 917 overlaps top panel 905. Either one or both top panels 905 and 917 may carry adhesive whereby when they are juxtaposed, they are bonded together.

In the next step, both front and rear pairs of top transverse side panels are folded in towards the respective sides of the commodity—that is, towards corner panels 927 and 929 and side panel 901. This is performed by both pairs of the top transverse side panels passing over the glue assembly G, where they receive a coating of glue (see FIG. 31), and the cooperating components of the elevator assembly E. Specifically, both pairs of top side panels pass through aperture 805 of the elevator assembly as the commodity is advanced into operative association with the latter by means of commodity-advancing means, and folded down by guide plate 807.

In the final step, both pairs of top side panels are securely juxtaposed to the respective sides of the commodity by means of guide plates 807 as the commodity is advanced into the enclosure 804 by the elevator 809, to assure a strong bond.

The resulting package of this invention is illustrated in FIG. 32. To remove the commodity A from the package, the tear tape 923 is ripped at one end of the front panel 917a (by means of lifting the area defined by the slit portions) and pulling the tear tape thus exposing the commodity A, in the manner shown in FIG. 33.

OPERATION

The above described apparatus is operated in intermittent timed-related sequence, as will be herein described. Prior to operation, a supply of wrapping material, such as precut sheets of kraft paper, is placed on a suitable supporting surface near the surface 101. An operator places a sheet in the area defined by guides 105, 105a, and 107 each time that the preceding sheet has been fed forward by the abutments 149. At the beginning of the intermittent timed-related sequence, the supporting platform 410 of the lowerator assembly is at the upper station.

The conveyor assembly delivers a single array A to the platform 301 of the loader assembly L where it is positioned thereon by means of the guide 309. Once in position, a limit switch activiates the barrier 205 which reciprocates across the path of the conveyor to prevent a further array A from entering the platform 301.

The paper feeding assembly is then activated by the positioning of a commodity A on the platform 301 in conjunction with an electronic eye connected to the loader assembly L. The paper feeding assembly advances a single sheet of wrapping material to and through the creasing rollers 117 and 133 and into the area defined by clamps 611 and guides 615 on the upper platform 601. Clamps 611 are activated by a limit switch operating in conjunction with the advancement of the sheet of wrapping material to grip the sheet and retain it in position. As the sheet approaches the clamps 611 it comes under the influence of the downwardly directed air streams from the nozzles 641. The air streams ensure that the leading edge of the sheet is sufficiently close to the surface of platform 601 to pass beneath the flap 640 and properly to encounter the clamps 611.

Subsequently, the piston 315 is activated by a limit switch, pushing forward a commodity A through the guide channel defined by guides 309 and 311 onto the sheet of wrapping material positioned on supporting surfaces 410 of the lowerator assembly. The commodity A, as it is propelled by the plate 307, encounters the flap 640 and presses the flap 640 downwardly into contact with the wrapping sheet against the spring loading of the flap. The flap 640 ensures that the forward edge of the commodity A rides over the clamped edge of the wrapper so that it does not tuck the sheet. The flap 640 springs upwardly when cleared by the commodity A.

On its return stroke, the piston 315 activates, in conjunction with a limit switch, the pusher component and the movable platform component of the lowerator assembly subsequently simultaneously. Thus, piston rod 422 of piston 420 is activated, abutting the top surface of the commodity A positioned on the wrapping material at the same time the piston rod 453 of the piston assembly 451 commences its forward stroke operating to lower the supporting platforms 410 from the upper platform 601 to the lower platform 275. As the platforms 410 begin to descend, the plates 605 break upwardly the panels of wrapping material which project on all sides of the commodity. It will be understood that the free edges of these panels move upwardly as the platforms 410 commence to move downwardly. To prevent the rearmost panel that is, the panel nearest plate 307 from becoming damaged by encountering the lower edges of the guide plates 309, and 311, these two plates 309 and 311 have appropriately positioned inverted U-shaped cut-outs in the lower edges thereof. The rearmost panel moves upwardly into these cut-outs.

The supporting surfaces 410, when at the lower platform 275, trip a limit switch activating pistons 475 and 477 which push forward the plates 483 and 485 to tuck-in the rear flaps and the top flap against the respective sides and top of the commodity.

The commodity advancing assembly is subsequently activated by means of a limit switch operating in conjunction with the supporting surfaces 410 when at the lower platform 275. More specifically, this limit switch, operating in a time-delayed manner, completes a circuit for the electric motor 541 which serves to drive sprocket pairs 503 and 504 thus advancing simultaneously the chains 501 and 501a. A pusher plate 555 of one hinge 511 connected to the chains 501 and 501a pushes forward a predetermined distance the partially wrapped commodity from the supporting surfaces 410 into the guide channel defined by ceiling guide 291 and sides 571 and 571a.

Once the partially wrapped commodity has been advanced from supporting surface 410 and the hinge 511 is clear of the aperture 277, the supporting surfaces 410 and the pusher component P return to their respective positions at the upper platform 601, which completes the cycle.

It will be understood that the commodities are advanced through the guide channel a predetermined distance during each cycle until they arrive at the elevator assembly E. The elevator assembly E operates a sequence with the above components, and specifically the commodity advancing mechanism so that when a substantially wrapped commodity is placed on the platform 819, the piston assembly 811 elevates the commodity within the enclosure 804.

The term "lowerator" used hereinbefore means an elevator, the operating stroke of which is in a downward direction and the return or idle stroke is in the upward direction. That is, it lowers the wrapping material and commodity thereon from an upper station to a lower station and performs an idle stroke in the upward direction.

It will be understood from the above description to those skilled in the art, that the components of the apparatus described may vary without departing from the spirit of this invention. Thus, it is contemplated within the scope of this invention that the above-described paper feeding assembly can be of a semi-automatic nature, feeding lengths of wrapping material, from a continuous roll, to the upper platform with provision being made for cutting the material at predetermined lengths to provide the individual sheets.

The apparatus just described is specifically adapted to wrap a commodity under compression. However, as will be understood, the apparatus may be modified to wrap commodities which do not have to be packaged under compression. Thus a commodity as it is fed onto a sheet of wrapping material on the elevator platform does not have to be placed under compression by converging guide plates 309 and 311, and the guide plates can merely serve to align the commodity on the wrapper. Further, the opposed guides 605 which retain the commodity in the compression when it is lowered from the upper platform 601 to the lower platform 275 do not have to compress the commodity, but can merely serve to juxtapose the panels of wrapping material to the commodity.

Further, it will be understood that the apparatus described may utilize various types of wrappers. Depending on the thickness and type of material being used, it may not be necessary to crease the wrapper prior to placing a commodity thereon. Thus, if sufficiently flexible material were used, crease lines 909, 931, 911 and 925 would not be required and the rolls used to provide these creases could be omitted.

Referring now to FIGS. 33 to 51 of the drawings, the apparatus, product and method illustrated therein represents a further embodiment of the invention wherein a commodity is packaged in a corrugated board wrapper. In this embodiment, certain components correspond to those described with respect to FIGS. 1 to 32a, and identical reference numerals have been used to illustrate the same. Further, in this embodiment, where certain assemblies correspond to those previously described, a detailed view and description has been omitted.

In this alternate embodiment, there is employed a wrapper feeding mechanism identified generally by reference numeral H for feeding individual sheets of corrugated board wrapper 902. The mechanism H includes a frame 102. A movable wrapper-retaining platform 104 holding a stack of corrugated wrappers 902 is mounted on two pairs of opposed movable chain belts 106 turned by suitable means (not shown) which serve to raise or lower the platform 104 as required. Framework 108 mounts a pair of pneumatically operated suction cups 110 serving to grip a single wrapper 902 from the stack of wrappers, and to advance the same into operative relationship with a wrapper engaging mechanism. The framework 108 is slidably mounted on guides 112, and is movable through a positive and return stroke by means of a pneumatically operated piston 114. The suction cups 110 are pneumatically operated through piston 120, which in turn, operates in timed relationship with piston 114 through a limit switch 118.

The wrapper feeding mechanism H advances a single wrapper 902 from a stack thereof into and through crease rollers 117 journalled on shaft 125 rotatably mounted in end bearings 119. A pair of endless belts 141 and 141a, mounted and driven in a manner similar to that described with reference to FIG. 6, serve to engage and advance a wrapper 902 into alignment with the elevator platforms 410 and 410a, as more particularly described in FIG. 14 and related figures. Guide 148 (FIG. 35) aligns the wrapper 902 on the upper platform 601.

In the embodiments shown in FIGS. 33, 34 and 35 of the drawings, the "loader" assembly shown is preferred for use in packaging a plurality of individual commodities, such as cans, etc. In this form of the loader assembly, the mechanism is mounted on frame members generally indicated by reference number 302 which in turn, are mounted on the upper platform 601. The frame 302 includes a pair of spaced apart guide rods 304, slidably mounting a pair of piston assemblies 302 and 308 each journalled thereon through bushings 310.

Piston assemblies 306, and 308, which are substantially identical, each include a piston rod 312 mounting a foot 314. In the embodiment shown in FIG. 33 and following, each foot 314 is equipped with a plurality of suction cups (not shown), the purpose of which will be described hereinafter. The feet 314 are guided by means of guide rods 342, slidably journalled in a bushing similar to the arrangement shown in FIG. 14.

Piston assemblies 306 and 308 are operated in unison by means of a pneumatically operated piston 316 having a piston rod 328 connected to a plate 320, which in turn, is connected to a frame 322 mounting the piston assemblies 306 and 308. In this manner, the piston 316, on its forward stroke, will serve to move the piston assemblies 306 and 308, from the right to the left as shown in FIG. 34. Upon its return stroke, the piston assemblies 306 and 308 are returned to the right so that the assembly 308 assumes the position shown by the phantom lines in FIG. 34, while assembly 306 asumes a position of assembly 308 shown in FIG. 34.

Operating in conjunction with the above described components of the loader assembly are a pair of conveyor belts 324 and 326 serving to transport a plurality of commodities into operational relationship with the piston assemblies 306 and 308.

The conveyor belts 324 and 326 are mounted adjacent the elevator platform 410 and are driven in a predetermined intermittent timed relationship to the piston assemblies 306 and 308.

The apparatus shown in FIGS. 33 to 35 includes a modified lowerator assembly to that of FIGS. 1 to 32a. Specifically the mechanism of FIG. 14a, as will be seen from FIGS. 34 and 40, now only includes guide plate 631 and opposed guides 634 consisting of a pair of curved bars. The guide 634 also continue to form the ceiling of the horizontal guideway through which the partially wrapped commodity passes, while a pair of opposed bars 636 form the respective sides of the guideway.

The mechanism for folding-in the rear corner flaps of the wrapper, once the commodity is lowered from the upper platform 601 to the lower platform 275, includes a piston assembly similar to that shown at FIG. 10, but modified to include only a pair of pneumatically operated fingers 486.

A glue mechanism, identified generally by reference numeral G, is located along each side of the horizontal guideway and serves to apply glue to the flaps of the partially wrapped commodity as it is advanced. The glue mechanism is illustrated in greater detail in FIGS. 46 and 47, and consists of glue supplied tubes 650 on each side of the guideway. The tubes 650 each mount a pair of nozzles 652, which apply glue to the required portions of the wrapper blank 902. The blue mechanism G is preferably pneumatically operated, and to this end, tubes 654 serve to connect the nozzles 652 to a suitable pneumatic system.

The mechanism for folding the top and bottom side panels inwardly into juxtaposition with the side of the commodity comprises in this form of the embodiment a curved guide panel 840 mounted on the lower platform 275 in alignment with the horizontal guide channel. The guide panel 840 consists of top and bottom inwardly converging portions 842, as illustrated in detail in FIG. 48.

In this embodiment of the invention, there may be employed suitable means for receiving and dispensing a wrapped commodity from the horizontal guide channel. Such a component is shown in FIGS. 34, 50 and 51 and includes a pair of opposed vertically arranged movable belts 806 and a pair of opposed "shoes" 808 defining a "chamber" therebetween. The belts 806 are positively driven through rollers 810 directed to a common drive shaft (not shown) which in turn, is rotated by a motor (not shown). Rollers 812 serve to retain the lower ends of the belts 806 in alignment. A plurality of rollers 814, extending the width of the belt 806, are rotatably journalled in a pair of opposed frame members 816 and serve to exert pressure against the inner face of the belts 806 which in turn, press against and retain a wrapped commodity in the chamber. A pair of adjustable top rollers 818 provide for increasing or decreasing the slack on the belts 806.

The shoes 808 are made adjustable so as to accommodate varying package widths. To this end, an adjustment mechanism identified by reference numeral 820 is provided, whereby the shoes may be moved inward or outward as required.

The means for removing a wrapped commodity from the top of the chamber includes a piston assembly indicated by reference numeral 822 is mounted on a frame 826 which in turn is connected to one of the shoes 808. A conveyor belt 828 is located adjacent the upper terminal end of one of the shoes 808, and is driven by means of motor (not shown). In this manner, the piston rod 824, activated by piston 822, will on its forward or positive stroke advance a package from the enclosure or chamber onto the conveyor belt 828 which will then remove the package from the apparatus.

The various stages through which a wrapper passes are illustrated in FIGS. 41, 43 and 45, starting with a wrapper blank 902 (FIG. 39) and ending up with the package of FIGS. 36 to 38. The blank 902 consists of a sheet of corrugated board with a bottom panel 904, front and rear panels 906 and 908 respectively and a top panel 910 all integrally connected. A manufacturer's flap 912 is integrally connected to one side of the front panel 910.

A pair of rear side flaps 914 extend on both lateral sides of the rear panel 908, and bottom side flaps 916 emanate from bottom panel 904. Similar to rear side panels 914, front side panels 918 emanate from the front panel 906. A pair of top side flaps 920 emanate from the lateral side of top panel 910.

The blank shown in FIG. 9 illustrates the portions to which glue is applied, as indicated by the shaded area thereon. It will be noted that both bottom side and top side pairs of panels 916 and 920, and the manufacturer's flap 912, are coated with adhesive according to one embodiment of this invention.

Referring now to FIG. 41, the corrugated wrapper 902 assumes the shape indicated in the drawing after being lowered from the upper platform 601 to the lower platform 275 on the elevator 410. At this stage, the rear panel 908 is upwardly folded against the commodity while the front and top panels 906 and 910 extend in a vertical manner with the side flaps 918 and 920 being in the same plane as the panels from which they emanate.

In the next operation, that illustrated in FIG. 42, the rear side flaps 914 of the rear panel 908 are juxtaposed against the respective sides of the commodity whereby the wrapper assumes the shape shown in FIG. 43. In this view, the front and top panels 906 and 910 are still in vertical position.

In the subsequent operation, the top panel 910 is juxtaposed to the top of the commodity as shown in FIG. 44. The wrapper then assumes the shape shown in FIG. 45 whereby front side panels 918 and the top panel 910 are juxtaposed to the respective portions of the commodity.

In the subsequent operation, the bottom side panel 916 and top side panel 920 are juxtaposed to the respective sides of the commodity, that is on top of panels 914 and 918, by means of the curved guide plates blank. The resulting article shown in FIGS. 36 to 38, is a very stable package possessing a high degree of strength in all dimensions. The contents of the package may be readily removed by lifting up and breaking the seal of the manufacturer's flap and tearing back on the top panel 910. Alternately, the top and bottom side panels 916 and 920 may be removed providing access to the sides of the package.

In the embodiment shown in FIGS. 36 to 39, and related figures, the front and rear side panels 914 and 918 extend approximately ⅓ of the width across the commodity. In some instances, it may be desirable to have the front and rear panels 914 and 918 substantially meet, but this is not necessary in most application. Likewise, the top and bottom side panels 916 and 920, although they are shown to meet at approximately the central point of the height of the commodity, may be varied.

According to an alternate aspect of the invention not specifically illustrated in the drawings, the manufacturers may be suitably located on panel 906 so that it is juxtaposed to panel 910. In most cases, the arrangement shown in the drawings is preferable since the packaged commodities once stacked, would show an undesirable increase in height on one side.

OPERATION OF ALTERNATE EMBODIMENT

In operation, the apparatus performs in a similar manner to that shown in FIGS. 1 to 32a. More particularly, a plurality of wrappers 902 are stacked on the platform 104, each wrapper having the outline of that shown in FIG. 39. The wrapper feed mechanism is then actuated and the suction cups 110 grip, elevate and advance a single wrapper 902 into and through crease rollers 117 and into gripping arrangement with the belts 141 and 141a, respectively. The belts 141 and 141a advance the wrapper 902 onto the upper platform 601 and into alignment with the elevator platform 410 in the manner described with reference to the earlier described operation.

A plurality of commodities to be wrapped are fed to the apparatus on the conveyors 326, located on either side of the elevator platform 410. Piston assemblies 306 and 308, containing feet 314, serve to load the commodities onto the wrapper 902 resting on the elevator 410, in a manner now to be described. Piston assembly 306 is first activated and descends onto the commodities located on conveyor belt 326, grips the commodities, advances from left to right (FIG. 34) to a position occupied by piston assembly 308 shown in FIG. 34, lowers the commodity onto the wrapper 902 and subsequently moves back into its original position as shown in FIG. 34. The piston assembly 308 operates in conjunction with piston assembly 306, and while assembly 306 is moving from left to right, piston assembly 308 moves to the position shown by phantom lines in FIG. 34, whereupon the latter descends to pick up a plurality of commodities from the other conveyor 326. Then, while piston assembly is moving from right to left, after having placed the commodities on the wrapper 902, piston assembly 308 will move to the position illustrated in FIG. 4 and lower its commodities on top of those previously placed on the wrapper by piston assembly 306. Piston 316 serves to move the piston assemblies 306 and 308 to their respective positions, through the piston rod 318 being connected to the frame of the assemblies 306 and 308. Thus, this form of the apparatus, two rolls of stacked commodities can be placed in juxtaposition on the wrapper 902 located on the elevator platform 410.

Once the commodities are so positioned, elevator platform 410 is actuated and moves downwardly whereby the front and rear panels 906 and 908 respectively are forward against the respective sides of the commodity by striking plates 631 and 634 as the elevator moves from the upper station 601 to the lower station 275. When the elevator platform 410 arrives at the lower station, the wrapper 902 containing the commodity assumes the shape shown in FIG. 41.

The arrival of the elevator platform 410 at the lower station activates the piston assembly carrying the movable guides 486, which then juxtapose the rear corner flaps 914 against the respective sides of the commodity, as shown in FIG. 42. The wrapper containing the commodity then assumes the shape shown in FIG. 43 at this point.

Subsequently, the means for displacing the commodity from the lower station, including a pressure plate 555 connected to a chain through member 551, abuts the rear panel 908 of the wrapper and advances the partially wrapped commodity through the guide channel defined by guides 634 and 636 located on the lower platform 275. As the partially wrapped commodity is advanced, the front corner flaps 918 and the top panel 910 abut the guides 636 and 634 respectively, which juxatpose these flaps to the respective portions of the commodity. The partially wrapped commodity then assumes the configuration shown in FIG. 45, after the operation carried out which is shown in FIG. 44.

As the partially wrapped commodity advances through the guide channel located on the lower platform 275, it encounters the glue mechanism whereby the top and bottom side panels 920 and 916 respectively are coated with a layer of adhesive dispensed by glue nozzles 652 carrying glue-applying feet 656. The areas of the wrapper to which the glue is applied are shown by the shaded lines in FIG. 39, with the exception of the manufacturer's flap 912 to which glue has been either previously applied or a contact adhesive is used.

The advancing mechanism including pressure plate 555 advances the commodity to the lower portion of the chamber defined by movable belts 806 and shoes 808, and specifically, advances the partially wrapped commodity onto the elevator platform 819. Prior to reaching the elevator platform 819, the top and bottom side flaps 920 and 916 encounter guide plate 840, whereby the curved portions 842 of this guide plate juxtapose the respective side flaps to the sides of the commodity, as shown in FIGS. 48 and 49. The commodity thus arrives at the elevator platform 819 with all panels of the wrapper, excepting the manufacturer's flap, being juxtaposed to the respective sides of the commodity.

Once on the elevator platform 819, the elevator mechanism is actuated whereby the pressure wrapped commodity is elevated into gripping arrangement with the movable belts 806. Prior to entry into gripping arrangement with the belts 806, the manufacturer's flap is juxtaposed against the rear panel 908 of wrapper by striking a fixed guide plate.

Once the wrapped commodity is in gripping arrangement with the movable belts 806, the belts then assume control of the wrapped commodity. The belts 806, positively driven, operate in conjunction with the elevator platform 819 whereby the wrapped commodity is moved upwardly a distance sufficient to permit a further wrapped commodity to be inserted into gripping relationship with the belts 806 without adjacent wrapped commodities abutting one another. Once a commodity reaches the top of the chamber, the piston assembly 822 is activated whereby the piston rod 824 pushes forward a wrapped commodity from the chamber onto the conveyor belt 828. The conveyor 828 then leads the wrapped commodities to a suitable storage point.

The apparatus of FIGS. 33 to 51 is adapted to operate an intermittent time-related sequence whereby a single wrapper 902 is fed from the stack of wrappers located on the platform 104 of the wrap preceding mechanism into and through creasing rollers 117 by means of the assembly mounting the suction cups 110. The wrapper 902 once placed in alignment on the elevator 410, actuates the piston assemblies 306 and 308 whereby two rolls of commodities, stacked in vertical alignment, are placed on the wrapper 902. Once this operation is completed, the elevator platform 410 containing the wrapper 902 mounting the commodities, is lowered from the upper platform 675 to the lower platform 201, effecting juxtaposition of the front and rear panels 908 and 906 to the front and rear sides of the commodity. When the elevator platform arrives at the lower station, the piston assembly mounting the movable guides 486 is then actuated, effecting juxtaposition of the rear corner panels 914 to the sides of the commodity. Once the movable guides 486 return, the advancing mechanism located beneath the lower platform 275 then intermittently advances the partially wrapped commodity to and through the guide channel. While the commodity is intermittently being advanced to and through the guide channel, additional operations are being carried out so that a plurality of spaced apart partially wrapped commodities may be advanced through the guide channel at the same time, such as in a manner described with reference to the apparatus of FIGS. 1 to 32a.

Once a partially wrapped commodity arrives at the elevator platform 819, the mechanism for actuating the elevator platform elevates the commodity into gripping arrangement with the opposed belts 806, which as previously mentioned then take over control of the wrapped commodity. The belts 806 also operate in intermittent relationship to the other componentary apparatus.

It will be understood with reference to the above description of FIGS. 33 to 51 that various changes and modifications can be made, without departing from the spirit and scope of the invention. Thus, the arrangement as shown with respect to FIGS. 1 to 32a of the original drawings can be modified so that one of the piston assemblies 306 and 308 carrying a foot 314 operates in conjunction with the elevator platform 410 whereby the foot 314 remains in juxtaposition with the top of the commodity as it descends from the upper platform 601 to the lower platform 275, such as is illustrated in FIG. 40. In other words, depending on the nature of the wrapper, the weight of the commodity, and whether or not the commodity is to be wrapped under compression, the piston assembly 306 or 308 may serve the purpose of only placing a commodity onto a wrapper in alignment with the elevator platform.

The apparatus illustrated in FIG. 33 and following may, depending on the specific arrangement employed, wrap commodities under compression if desired. The compression wrapping of commodities can be achieved by subjecting the commodity to pressure as it descends from the upper platform to the lower platform, and by causing lateral pressure. This may be carried out by adjusting the width between guide plate 631 and guide bar 634 in the vertical direction, and in the lateral direction, by varying the height and width of guides 634 and 636. In a like manner, the width between the movable belts 806 of the chamber defined by these belts and shoe 808 may be decreased whereby a wrapped commodity is retained under pressure as it upwardly advances to permit the adhesive to set.

In a similar manner, the apparatus of FIG. 1 and following may compression wrap a commodity or alternately merely juxtapose a wrapper to a commodity. Specifically, a commodity does not have to be placed under compression by converging guide plates 390 and 311, but the latter can merely serve to align the commodity on the wrapper. Similarly, the opposed guides 605 which retain the commodity under compression when it is lowered from the upper platform 601 to the lower platform 275 can merely serve to juxtapose the wrapper to the commodity.

The resultant commodity, whether wrapped under compression or not, presents a very compact, economically-wrapped product. As will be evident from the figures, substantially all sides of the wrapper may be used for advertising purposes, and in addition, a minimum amount of wrapper material is employed to produce the package.

It will also be understood that throughout the disclosure, reference has been made to the application of a suitable adhesive or glue to certain portions of the wrapping material, other means of retaining the respective portions of the wrapper in juxtaposition with each other can be used. Thus suitable adhesives, adhesive tapes, etc. can be pre-applied to the wrapper prior to being used for wrapping the commodity.

The apparatus and method of this invention are readily adaptable for wrapping a large variety of commodities. For example, applicant has found it highly successful to wrap commodities placed in synthetic resin bags, cans, articles which have previously been wrapped in boxes, etc.

Turning now to FIGS. 52 to 55, there is illustrated an alternate product produced by the procedures described above, and which will be explained as follows.

The product shown in FIGS. 52 to 55 may be produced by using the apparatus illustrated in FIG. 33 and following, but with minor modifications to the components previously described which would otherwise be for juxtaposing the top and associated panels of the wrapper to the top and sides of the commodity.

The package of FIGS. 52 to 55 is particularly suitable for packaging commodities where it is desired to have an open-topped package for showing the contents of the package, or for display purposes.

The blank forming the package illustrated in FIG. 52 (which has been subjected to a first step) is similar to the blank shown in FIG. 39, with the exception that the right-hand panel of the blank in FIG. 39 is eliminated. Thus, in FIG. 52, a blank consists of a bottom panel 975, a side panel 976, and opposed side panel 977, and panels 978 extending from the side edges of panel 976, and end panels 979 extending beyond the side edges of panel 977. Panel 975 is provided with end panels 980 extending beyond its side edges.

Specifically, FIG. 52 shows the set-up of the blank after the first operation whereby the side panels 977 and 976 (together with their respective panels 978 and 979). Following this operation, the flaps 978 and 979 are subsequently juxtaposed against the side of the commodity, resulting in the configuration shown in FIG. 53.

The next step, the side flaps 980 are subjected to a gluing operation whereby adhesive, indicated by reference numeral 985, is applied to the flaps in the positions indicated. FIG. 54 illustrates the configuration of the container at this point.

Subsequently, the container is then subjected to a final step whereby the end flaps 980 are juxtaposed against the flaps 978 and 979, resulting in the product shown in FIG. 55.

I claim:

1. Apparatus for wrapping a commodity comprising, upper and lower stations; means movable therebetween adapted to lower a commodity placed on a wrapper from the upper to the lower of said stations; means for placing a wrapper on said means when the latter is at said upper station; means for placing a commodity on said wrapper; means between said upper and lower stations adapted to juxtapose portions of said wrapper to said commodity as said means moves from said upper to said lower stations; and wrapper folding means for juxtaposing the balance of the wrapper to the commodity; said movable means comprising an elevator platform movable between said upper and lower stations, and including delivery means for delivering to said elevator platform a sheet wrapper, commodity placing means for placing a commodity in register on top of the wrapper while the elevator platform is at said upper station, and means effective upon the elevator platform descending from said upper station to said lower station for juxtaposing parts of said wrapper to sides of the commodity thereby partly to wrap the commodity; and commodity placing means for placing a commodity in register on top of the wrapper while the elevator platform is at the upper station, means effective upon the elevator platform while descending from said upper to said lower station for juxtaposition of front and rear portions of said wrapper to the respective portion of the commodity, means for juxtaposing a pair of rear corner flaps to the commodity while said commodity is at said lower station, means for juxtaposing to the commodity front corner flaps, means for juxtaposing to the top of the commodity a top portion of the wrapper, means for displacing said commodity from said lower station, means for juxtaposing bottom and top lateral side portions of the wrapper to the commodity and means for juxtaposing a manufacturer's flap to the portion of the wrapper.

2. An apparatus for wrapping a commodity comprising, upper and lower stations; means movable therebetween adapted to lower a commodity placed on a wrapper from the upper to the lower of said stations; means for placing a wrapper on said means when the latter is at said upper station; means for placing a commodity on said wrapper; means between said upper and lower stations adapted to juxtapose portions of said wrapper to said commodity as said means moves from said upper to said lower stations; and wrapper folding means for juxtaposing the balance of the wrapper to the commodity; said means for placing a sheet material comprising delivery means for delivering to said elevator a sheet wrapper, said apparatus including commodity placing means for placing a commodity on top of the wrapper in register therewith while said elevator is at said upper station, retaining means for retaining said commodity in register with the wrapper as the elevator descends from said upper to said lower station, means acting as the elevator descends from said upper to said lower station for juxtaposing parts of the wrapper front and rear to the sides of said commodity and to form projecting front and rear flaps and front and rear corner webs, means in advance of and means in rear of said lower station for juxtaposing said corner webs to the sides of said commodity, further means in advance of said lower station for juxtaposing said front flap to the top of said commodity, further means in the rear of said lower station for juxtaposing said rear flap to the top of the commodity thereby to provide first and second transverse top flaps extending laterally beyond the upper side edges of the commodity, means for juxtaposing said first and second transverse top flaps to the respective sides of said commodity, and means for operating said elevator, said delivery means and said commodity placing means in intermittent time-related sequence whereby said delivery means delivers a sheet of wrapping material to said elevator, said commodity placing means places a commodity on the sheet of wrapping material and in the above-identified position thereon, said elevator descends between said upper and lower stations and while said means acting as the elevator descends to juxtapose parts of the wrapper to said commodity; and the remaining sides of the wrapper are juxtaposed to the respective sides and top of the commodity.

3. An apparatus, as defined in claim 2, wherein said delivery means delivers a sheet of creased wrapping material to said elevator and comprises a supporting surface in operative relationship to said upper station and having a sheet-wrapping material retaining area adapted to retain a plurality of stacked sheets thereon, and means for advancing an individual sheet from said sheet wrapping material retaining area to and through said cooperating rollers and into a sheet wrapping material receiving area at said upper station.

4. An apparatus, as defined in claim 2, wherein said means for retaining a sheet of wrapping material at said upper station comprises a pair of spaced-apart parallel guides on either lateral side of said aperture, and gripping means on one longitudinal side of said aperture for retaining a sheet of wrapping material thereon when advanced by the means for delivering a sheet of wrapping material.

5. An apparatus, as defined in claim 2, wherein said means adapted to juxtapose the rear corner webs and said means adapted to juxtapose the rear top flap to the commodity comprises a piston assembly mounted at said lower station, said assembly including a pair of vertically aligned co-acting pistons, one of said pistons mounting a reciprocating piston rod carrying a spaced-apart pair of vertical fingers adapted to juxtapose the rear webs to the respective sides of the commodity, the other of said pistons mounting a reciprocating piston rod carrying horizontally disposed means adapted to juxtapose the rear top flap to said commodity.

6. An apparatus, as defined in claim 2, wherein said upper and lower stations comprise vertically spaced-apart parallel upper and lower platforms mounted on said frame and each having an aperture therein, each aperture being in registry with the other, and said elevator being movable between the respective apertures of said upper and lower platforms.

7. An apparatus, as defined in claim 3, including conveying means for delivering a plurality of commodities to said placing means and barrier means between said conveying means and said placing means whereby said commodities are delivered one-by-one into operative relationship with said placing means by said conveying means.

8. An apparatus, as defined in claim 2, wherein said means for juxtaposing said front corner webs to the sides of a commodity and said means for juxtaposing said front flap to the top of a commodity includes a pair of spaced-apart vertical guides and a top horizontal guide defining therebetween a guide channel, and means for advancing a commodity from said elevator to and through said guide channel whereby said vertical guides juxtapose said front cover webs to the respective sides of the commodity and said horizontal guide juxtaposes said front flap to the top of said commodity.

9. An apparatus, as defined in claim 2, wherein said upper and lower stations comprise vertically spaced-apart upper and lower platforms, said elevator including a pair of spaced-apart supporting surfaces operable between said upper station and said aperture of said lower platform, said lower platform mounting a guide channel, a further aperture in advance of an connected to said first-mentioned aperture and extending to and through said guide channel, and means for advancing a commodity from said elevator to and through said guide channel passing from said first-mentioned aperture between said spaced-apart supporting surfaces through said guide channel.

10. An apparatus, as defined in claim 9, wherein said means for advancing a commodity comprises an endless belt beneath said lower platform, a plurality of spaced-apart hinges on said endless belt each mounting a push plate adapted to contact and push forward a commodity, said hinges being in registery with said apertures of said lower platform whereby said push plates extend above said lower platform, and drive means for operating said endless belt in intermittent timed sequence with said elevator, whereby when said elevator lowers a commodity from said upper station to said lower station said drive means operates said endless belt to push forward a commodity from said elevator into and through said guide channel.

11. An apparatus, as defined in claim 10, including means for receiving a wrapped commodity advance to and and through said guide channel, said means including a commodity-retaining enclosure with an opening therein in operative asociation to said guide channel.

12. An apparatus, as defined in claim 11, wherein said commodity-retaining enclosure comprises a vertical open-ended rectangular enclosure adapted to receive and retain a plurality of wrapped commodities, said enclosure having an opening in registry with said guide channel, gripping means within said enclosure adapted to releasably retain a commodity, and means within said enclosure at one end thereof and in operative association with said guide channel adapted to receive and elevate a commodity to said gripping means.

13. An apparatus, as defined in claim 1, wherein there is included means adapted to juxtapose a pair of rear side flaps of wrapper to the sides of the commodity, said means including a piston assembly mounting a piston rod, said piston rod being provided with a pair of spaced apart fingers, and means for operating said piston assembly in intermittent time related sequence to the arrival of said elevator at said lower station whereby said piston assembly is activated to advance said piston rod thereby to abut said rear side flaps into juxtaposition with the sides of a commodity.

14. An apparatus, as defined in claim 1, including conveying means for delivering a plurality of commodities to said commodity placing means, comprising a pair of spaced apart conveying means terminating on either side of the elevator.

15. An apparatus, as defined in claim 1, including conveying means for delivering a plurality of commodities to said commodity placing means, comprising a pair of spaced apart conveying means terminating on either side of the elevator, said commodity placing means comprising a pair of piston assemblies mounted above said upper station in operational relationship to said elevator platform, said pair of piston assemblies each including a piston rod mounting the commodity gripping and retaining surface and means for operating said piston assemblies in unison whereby one of said piston assemblies is operable to receive a commodity from one of said conveyors and load the commodity onto the wrapper in alignment with said elevator while the other of said piston assemblies is operable to receive a commodity from the other of said conveyors when said first-mentioned piston assembly is loading a commodity onto said wrapper.

16. An apparatus, as defined in claim 1, including means for juxtaposing a pair of front side flaps of wrapper to the sides of the commodity, said means comprising a pair of spaced apart guides in advance of the elevator platform at the lower station, said apparatus including means for juxtaposing the top panel of wrapper material to the top of the commodity comprising a pair of horizontal guides located in advance of the elevator platform at the lower station, said first-mentioned guides and said second-mentioned guides defining therebetween a guide channel for which the resultant partially wrapped commodity may be advanced, and means for advancing said commodity from said elevator at the lower station to and through said guide channel whereby said first-mentioned guide means juxtaposes the front side panels of wrapper to the sides of the commodity and said second-mentioned guide means juxtaposes the top panel of wrapper to the top of the commodity.

17. An apparatus, as defined in claim 16, including means in said guide channel for juxtaposing top and bottom side panels of wrapper to the sides of the commodity, comprising, a pair of spaced-apart converging guides located on either side of said guide channel, said guide means being operable to juxtapose said top and bottom side panels of wrapper to the respective sides of the commodity as the commodity is advanced through said guide channel.

18. An apparatus, as defined in claim 1, including means for advancing a commodity from the elevator at said lower station to a discharge point, said means for advancing a commodity comprising an endless belt beneath said lower platform, a plurality of spaced-apart hinges on said endless belt each mounting a push plate adapted to contact and push forward a commodity, said hinges being in registry with said apertures of said lower platform whereby said push plates extend above said lower platform, and drive means for operating said endless belt in intermittent timed sequence with said elevator, whereby when said elevator lowers a commodity from said upper station to said lower station said drive means operates said endless belt to push forward a commodity from said elevator into and through a guide channel.

19. An apparatus, as defined in claim 1, including means for receiving and retaining a wrapped commodity, said means including a commodity-retaining enclosure comprising a vertical open-ended substantially rectangular enclosure adapted to receive and retain a wrapped commodity, said enclosure comprising a pair of spaced-apart movable belts and a pair of spaced-apart shoes, means for upwardly moving said belts in intermittent time-related sequence, and means at the top of said enclosure for discharging a wrapped commodity from said enclosure.

20. An apparatus, as defined in claim 19, wherein said means at the top of said enclosure for discharging a wrapped commodity comprises a piston assembly mounting a reciprocating piston rod, and means for operating said piston assembly in intermittent time-related sequence to the movement of a wrapped commodity to and through said vertical enclosure whereby when a wrapped commodity is at the top of said enclosure, said piston assembly operates to reciprocate said piston rod and push forward a wrapped commodity from said enclosure.

21. An apparatus for wrapping a commodity comprising, upper and lower stations; means movable therebetween adapted to lower a commodity placed on a wrapper from the upper to the lower of said stations; means for placing a wrapper on said means when the latter is at said upper station; means for placing a commodity on said wrapper; means between said upper and lower stations adapted to juxtapose portions of said wrapper to said commodity as said means moves from said upper to said lower stations; and wrapper folding means for juxtaposing the balance of the wrapper to the commodity; said movable means comprising an elevator platform movable between said upper and lower stations, and including delivery means for delivering to said elevator platform a sheet wrapper, commodity placing means for placing a commodity in register on top of the wrapper while the elevator platform is at said upper station, and means effective upon the elevator platform descending from said upper station to said lower station for juxtaposing parts of said wrapper to sides of the commodity thereby partly to wrap the commodity; and said elevator including a pair of transversely spaced-apart horizontal platforms, a pair of vertically disposed racks each mounting one of these pair of platforms, and means for reciprocating said racks in unison through a positive and return stroke.

22. An apparatus for wrapping a commodity comprising, upper and lower stations; means movable therebetween adapted to lower a commodity placed on a wrapper from the upper to the lower of said stations; means for placing a wrapper on said means when the latter is at said upper station; means for placing a commodity on said wrapper; means between said upper and lower stations adapted to juxtapose portions of said wrapper to said commodity as said means moves from said upper to said lower stations; and wrapper folding means for juxtaposing the balance of the wrapper to the commodity; said movable means comprising an elevator platform movable between said upper and lower stations, and including delivery means for delivering to said elevator platform a sheet wrapper, commodity placing means for placing a commodity in register on top of the wrapper while the elevator platform is at said upper station, and means effective upon the elevator platform descending from said upper station to said lower station for juxtaposing parts of said wrapper to sides of the commodity thereby partly to wrap the commodity; and said elevator including a pair of transversely spaced-apart horizontal platforms, a pair of vertically disposed racks each mounting one of these pair of platforms operative through a positive and return stroke between said upper and lower stations, a rotatable rod mounting a pair of gears each engaging one of said racks, and means for rotating said rotatable rod through said positive and return stroke.

References Cited

UNITED STATES PATENTS

| | | | |
|---|---|---|---|
| Re. 18,341 | 1/1932 | Smith | 53—209 |
| 2,357,009 | 8/1944 | Klein | 229—32 |
| 2,590,371 | 3/1952 | Bergstein | 229—32 |
| 2,684,501 | 7/1954 | Holly | 53—157 X |
| 2,790,287 | 4/1957 | Kraft | 53—157 |
| 2,816,408 | 12/1957 | Powers | 53—209 |
| 2,833,404 | 5/1958 | Jacobs et al. | 206—65 |
| 3,006,119 | 10/1961 | Fingerhut | 53—124 |
| 3,126,683 | 3/1964 | Richards | 53—157 X |
| 3,206,103 | 9/1965 | Bixler | 229—51 |
| 3,263,807 | 8/1966 | Fingerhut | 229—51 |
| 3,315,435 | 4/1967 | Gunyou | 53—124 X |
| 3,347,176 | 10/1967 | Hall | 53—124 |
| 3,354,600 | 11/1967 | Hoffmann | 53—24 |
| 3,363,396 | 1/1968 | Lockrow | 53—124 |
| 3,383,825 | 5/1968 | Titchenal | 53—124 X |
| 3,402,524 | 9/1968 | Griner | 53—159 |
| 3,407,562 | 10/1968 | Nicola | 53—24 |

WAYNE A. MORSE, Primary Examiner

U.S. Cl. X.R.

53—157, 159, 209